US007327361B2

(12) United States Patent
Shimamura et al.

(10) Patent No.: US 7,327,361 B2
(45) Date of Patent: Feb. 5, 2008

(54) THREE-DIMENSIONAL IMAGE GENERATING APPARATUS, STORAGE MEDIUM STORING A THREE-DIMENSIONAL IMAGE GENERATING PROGRAM, AND THREE-DIMENSIONAL IMAGE GENERATING METHOD

(75) Inventors: Takayuki Shimamura, Kyoto (JP); Takuhiro Dohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 213 days.

(21) Appl. No.: 11/106,538

(22) Filed: Apr. 15, 2005

(65) Prior Publication Data
US 2005/0237323 A1 Oct. 27, 2005

(30) Foreign Application Priority Data
Apr. 26, 2004 (JP) ............................. 2004-129252

(51) Int. Cl.
*G06T 15/40* (2006.01)
*G06T 15/50* (2006.01)
*G06T 15/10* (2006.01)
*G06T 15/20* (2006.01)

(52) U.S. Cl. ..................... 345/422; 345/426; 345/427
(58) Field of Classification Search ............... None
See application file for complete search history.

(56) References Cited

U.S. PATENT DOCUMENTS 6,018,348 A * 1/2000 Sprague ..................... 345/421

6,421,056 B1 * 7/2002 Nishiumi et al. ............ 345/474
2002/0022515 A1 * 2/2002 Boku et al. ................... 463/31

FOREIGN PATENT DOCUMENTS

| JP | 9-167260 | 6/1997 |
| JP | 2002-360920 | 12/2002 |
| JP | 2003-334380 | 11/2003 |

OTHER PUBLICATIONS

Cary B. Phillips, Norman I. Badler, John Granieri, "Automatic viewing control for 3D direct manipulation", Symposium on Interactive 3D Graphics, Proceedings of the 1992 symposium on Interactive 3D graphics, Cambridge, Massachusetts, United States, pp. 71-74, Year of Publication: 1992, Publisher: ACM Press New York, NY, USA.*

* cited by examiner

*Primary Examiner*—Mark Zimmerman
*Assistant Examiner*—Gene Tseng
(74) *Attorney, Agent, or Firm*—Nixon & Vanderhye PC

(57) ABSTRACT

A video game apparatus used as a three-dimensional imaging apparatus includes a CPU. The CPU works together with a GPU to generate and display a game image. More specifically, some objects are arranged in a virtual three-dimensional space. The virtual three-dimensional space is converted into a viewpoint coordinate and then projected and converted. After the projection conversion, determination points are set corresponding to a specific object, and the degree to which the specific object is hidden is calculated on the basis of a Z value of the specific object and the Z values of the determination points. At least one aspect of the display may be changed according to the degree to which the specific object is hidden.

22 Claims, 13 Drawing Sheets (A)

(B)

(A)

(B)

(A)

(B)

IT IS POSSIBLE TO PRODUCE VISUAL SCENE IN WHICH POINT-SOURCE LIGHT IS HALF HIDDEN (A)

(B)

THREE-DIMENSIONAL IMAGE GENERATING APPARATUS, STORAGE MEDIUM STORING A THREE-DIMENSIONAL IMAGE GENERATING PROGRAM, AND THREE-DIMENSIONAL IMAGE GENERATING METHOD

TECHNOLOGICAL FIELD

The illustrative embodiments relate to a three-dimensional image generating apparatus, a storage medium storing a three-dimensional image generating program, and a three-dimensional image generating method. More specifically, the illustrative embodiments relate to a three-dimensional image generating apparatus, a storage medium storing a three-dimensional image generating program, and a three-dimensional image generating method by which a three-dimensional image is generated according to an operator's operation input.

BACKGROUND AND SUMMARY

In the so-called computer graphics (CG) technology field well known to the general public, a virtual three-dimensional space is established, objects are rendered and a virtual screen is provided in this space, and a rendered (displayed) image is projected and converted, and displayed on the screen. According to the CG technology, it is necessary to control a viewpoint in order to determine from what position an image seen in the virtual space should be displayed. The control of a viewpoint is important especially in such a game where a three-dimensional image is rendered in real time according to input from a controller. More specifically, an object to be noted may be hidden by another object depending on the setting of a viewpoint, which makes it impossible to obtain an intended image from that viewpoint. In such a case, it is a general practice to move the viewpoint to a position where the object to be noted is not hidden by another object.

For example, one example of such a conventional kind of three-dimensional image generating apparatus is disclosed in Japanese Patent Laying-open No. H9-167260 laid-open on Jun. 24, 1997 (document 1). According to document 1, if any hiding material such as another object comes in between an object to be operated and a camera in the game space, the camera is rotated and moved to a position where the hiding material does not hide the object to be operated. In this manner, the object to be operated is constantly displayed within the screen.

Also, another example of conventional three-dimensional image generating apparatus is disclosed in Japanese Patent Laying-open No. 2002-360920 laid-open on Dec. 17, 2002 (document 2). According to document 2, if any hiding material enters between a player character and a camera, the camera is brought closer to the player character until the hiding material no longer hides the player character.

Moreover, still another example of conventional three-dimensional image generating apparatus is disclosed in Japanese Patent Laying-open No. 2003-334380 laid-open on Nov. 25, 2003 (document 3). According to document 3, if any hiding material cuts in between a player character and a camera, the camera is moved inside the hiding material not so as to cause sudden changes in an image.

In any of the prior arts, however, the position of a camera is changed to move a viewpoint whenever a hiding material enters between an object to be operated (player character) and the camera. Thus, in case where a large number of objects are rendered in the virtual three-dimensional space, the viewpoint is moved at frequent intervals, which may cause an operator (player) discomfort. Also, the movement of the viewpoint takes place even in the case where only a portion of the object to be operated is hidden by the hiding material and in the case where it is permitted in terms of screen expressive technique that the object to be operated is hidden to some extent by the hiding material. To avoid this problem, it is conceivable to detect (calculate) a degree that the object to be operated is hidden (the degree of hiding) and control the movement of the viewpoint according to the degree of hiding. However, for detection of the degree of hiding, any of the prior arts requires increasing the number of gaze points and also such a process is to be performed in the three-dimensional space, which causes a problem of a growing load of operation.

The illustrative implementations provide a novel three-dimensional image generating apparatus, storage medium storing a three-dimensional image generating program, and three-dimensional image generating method.

One illustrative embodiment provides a three-dimensional image generating apparatus, storage medium storing a three-dimensional image generating program, and three-dimensional image generating method which make it easy to generate a display image where, with respect to a determination as to whether or not an object, to be considered out of objects followed by a camera, is hidden, a degree that the object is hidden is taken into consideration.

A further illustrative embodiment provides a three-dimensional image generating apparatus, storage medium storing a three-dimensional image generating program, and three-dimensional image generating method which make it possible to generate a display image that expresses a partially hidden object hidden.

A three-dimensional image generating apparatus according to an illustrative embodiment generates a three-dimensional image according to an operator's operation input. The three-dimensional image generating apparatus comprises an operation input detecting means, an object data storing means, a displaying means, a virtual three-dimensional space generating means, a viewpoint controlling means, a display image generating means, a depth value storing means, an object arrangement position storing means, a determination point setting means, a determining means, and a degree-of-hiding calculating means. The operation input detecting means detects the operator's operation input. The object data storing means stores object data for rendering objects forming a three-dimensional image. The displaying means displays an image projected onto a projection screen within a virtual three-dimensional space. The virtual three-dimensional space generating means generates the virtual three-dimensional space based on the operation input detected by the operation input detecting means and the object data stored in the object data storing means. The viewpoint controlling means controls a viewpoint within the virtual three-dimensional space generated by the virtual three-dimensional space generating means. The display image generating means generates the image of the virtual three-dimensional space seen from the viewpoint controlled by the viewpoint controlling means, which is projected onto the projection screen. The depth value storing means stores a depth value of each pixel of the image generated by the display image generating means. The object arrangement position storing means stores at least an arrangement position of a specific object in the virtual three-dimensional space. The determination point setting means sets a predetermined number of determination points in a predetermined area containing the arrangement position of the specific object in the image. The determining means determines whether or not a first depth value of the predetermined number of determination points set by the determination point setting means is smaller than a second depth value of the specific object. The degree-of-hiding calculating means calculates a degree of hiding of the specific object according to the number of the determination points where it is determined by the determining means that the first depth value is smaller than the second depth value.

More specifically, a three-dimensional image generating apparatus (12: reference numeral used for illustrative purposes) generates a three-dimensional image according to an operator's operation input. The operator's operation input is detected by an operation input detecting means (36, S1). An object data storing means (40) stores object data for rendering objects forming a three-dimensional image. A displaying means (34, 36, 38, 58) displays an image projected onto a projection screen within a virtual three-dimensional space. A virtual three-dimensional space generating means (36, 42, S3) generates the virtual three-dimensional space based on the operation input detected by the operation input detecting means (36, S1) and the object data stored in the object data storing means (40). A viewpoint controlling means (36, S5) controls a viewpoint (virtual camera) within the virtual three-dimensional space generated by the virtual three-dimensional space generating means (36, 42, S3). That is, it controls a position and orientation of the viewpoint. A display image generating means (36, 42, S7, S9, S11) generates the image of the virtual three-dimensional space seen from the viewpoint controlled by the viewpoint controlling means (36, S5), which is projected onto the projection screen. That is, a projection conversion process is carried out. A depth value storing means (50) stores a depth value (Z value) of each pixel of the image generated by the display image generating means (36, 42, S7, S9, S11). An object arrangement position storing means (36, 40) stores at least an arrangement position (current position) of a specific object in the virtual three-dimensional space. A determination point setting means (36, S15) sets a predetermined number of determination points in a predetermined area containing the arrangement position of the specific object of the projected and converted image. A determining means (36, S53 to S63) determines whether or not a first depth value of the predetermined number of determination points set by the determination point setting means (36, S65) is smaller than a second depth value of the specific object. That is, it determines whether or not there exists any hiding material between the viewpoint and the specific object. A degree-of-hiding calculating means (36, S65) calculates a degree of hiding of the specific object according to the number of the determination points where it is determined by the determining means that the first depth value is smaller than the second depth value.

According to the illustrative embodiments, the degree of hiding can be easily calculated because it is just determined whether or not the depth value of the determination points set for the specific projected and converted object is smaller than the depth value of the specific object.

In one illustrative embodiment, the determination point setting means sets the determination points in an area adjacent to and embracing the specific object projected onto the projection screen. More specifically, the determination point setting means (36, S15) sets determination points in an area adjacent to and embracing the specific object projected onto the projection screen. For example, determination points are set in proximity to the specific object. That is, the determination points are set in an area embracing the specific object, and thus it is possible to more accurately know the degree that the specific object is hidden by another object.

In another illustrative embodiment, in a case where the specific object in the virtual three-dimensional space is projected onto the projection screen, the determination point setting means sets the determination points on the circumference of a circle adjacent to and embracing the specific object projected onto the projection screen. More specifically, in a case where the specific object within the virtual three-dimensional space is projected onto the projection screen, the determination point setting means (36, S15) sets determination points on the circumference of a circle adjacent to and embracing the specific object projected onto the projection screen. As stated above, determination points are set on the circumference of a circle adjacent to and embracing the specific projected and converted object, and thus it is possible to set determination points more easily than set determination points on the circumference of a graphic form other than a circle.

In another illustrative embodiment, the degree-of-hiding calculating means calculates a proportion of the number of the determination points where it is determined by the determining means that the first depth value is smaller than the second depth value, with respect to the total number of the determination points. The viewpoint controlling means moves the viewpoint to another location according to the proportion calculated by the degree-of-hiding calculating means. More specifically, the degree-of-hiding calculating means (36, S65) calculates the proportion (degree of hiding) of the number of the determination points where it is determined by the determining means (36, S53 to S63) that the first depth value is smaller than the second depth value, with respect to the total number of determination points. The viewpoint controlling means (36, S25) moves the viewpoint to another location according to the degree of hiding ("YES" in a step S23) calculated by the degree-of-hiding calculating means. In this manner, the viewpoint is moved to another location according to the calculated degree of hiding, and thus, in case where the specific object is hard to see due to a high degree of hiding, for example, it is possible to move the viewpoint and generate an easy-to-see image of the specific object.

In a further illustrative embodiment, the viewpoint controlling means repeats the movement of the viewpoint until the proportion calculated by the degree-of-hiding calculating means becomes smaller than a predetermined value. More specifically, the viewpoint controlling means (36, S25) repeats the movement of the viewpoint until the proportion (degree of hiding) calculated by the degree-of-hiding calculating means (36, S65) becomes smaller than a predetermined value ("NO" in the step S23). As described above, the movement of the viewpoint is repeated until the degree of hiding becomes smaller than a predetermined value, and thus the viewpoint can be moved in such a manner that a hiding state is maintained to some extent, not in an abrupt manner. That is, it is possible to generate such an image where the specific object is hidden to some extent.

In still a further illustrative embodiment, the degree-of-hiding calculating means calculates a proportion of the number of the determination points where it is determined by the determining means that the first depth value is smaller than the second depth value, with respect to the total number of the determination points, and further comprises a parameter changing means for changing a parameter related to display of the specific object according to the proportion calculated by the degree-of-hiding calculating means. More specifically, the degree-of-hiding calculating means (36, S65) calculates a proportion (degree of hiding) of the number of the determination points where it is determined by the determining means (36, S53 to S63) that the first depth value is smaller than the second depth value. The parameter changing means (36, S21) changes a parameter related to display of the specific object according to the proportion calculated by the degree-of-hiding calculating means (36, S65). In this manner, it is also possible to generate an image according to the degree of hiding by changing a parameter related to display of the specific object according to the degree of hiding.

In yet a further embodiment, the specific object includes a light source and the parameter changing means changes at least the brightness of the light source. More specifically, the specific object includes a light source and the parameter changing means (36, S21) changes at least the brightness of the light source. Therefore, it is possible to generate such a screen where light from the light source shines from behind an object. This makes it possible to achieve a more real scenic effect.

A storage medium according to an illustrative embodiment stores a three-dimensional image generating program, and the three-dimensional image generating program is executed by a processor of a three-dimensional image generating apparatus. The three-dimensional image generating apparatus comprises an operation input detecting means, an object data storing means, a displaying means, and a depth value storing means. The operation input detecting means detects an operator's operation input. The object data storing means stores object data for rendering objects forming a three-dimensional image. The displaying means displays an image projected onto a projection screen within a virtual three-dimensional space. The depth value storing means stores a depth value of each pixel of the image.

The three-dimensional image generating program causes the processor of the three-dimensional image generating apparatus to execute a three-dimensional space generating step, a viewpoint controlling step, a display image generating step, an object arrangement position storing step, a determination point setting step, a determining step, and a degree-of-hiding calculating step. In the three-dimensional space generating step, a virtual three-dimensional space is generated on the basis of operation input detected by the operation input detecting means and object data stored in the object data storing means. In the viewpoint controlling step, a viewpoint is controlled within the virtual three-dimensional space generated in the virtual three-dimensional space generating step. In the display image generating step, an image of the virtual three-dimensional space seen from the viewpoint controlled by the viewpoint controlling step, which is projected onto a projection screen is generated. In the object arrangement position storing step, at least an arrangement position of a specific object in the virtual three-dimensional space is stored. In the determination point setting step, a predetermined number of determination points are set in a predetermined area embracing the arrangement position of the specific object in the image. In the determining step, it is determined whether or not a first depth value of the predetermined number of the determination points, set in the determination point setting step, is smaller than a second depth value of the specific object. In the degree-of-hiding calculating step, the degree of hiding of the specific object is calculated according to the number of the determination points where it is determined, in the determining step, that the first depth value is smaller than the second depth value.

In one exemplary storage medium storing a three-dimensional image generating program, it is possible to easily generate a display image with consideration given to the degree of hiding, as in the case with an exemplary three-dimensional image generating apparatus.

A three-dimensional image generating method according to an illustrative embodiment is a three-dimensional image generating method for a three-dimensional image generating apparatus comprising an operation input detecting means for detecting an operator's operation input, an object data storing means for storing object data for rendering objects forming a three-dimensional image, a displaying means for displaying an image projected onto a projection screen within a virtual three-dimensional space, and a depth value storing means for storing a depth value of each pixel of the image. The method includes the following steps of: (a) generating a virtual three-dimensional space based on the operation input detected by the operation input detecting means and the object data stored in the object data storing means; (b) controlling a viewpoint within the virtual three-dimensional space generated in step (a); (c) generating an image of the virtual three-dimensional space seen from the viewpoint controlled in step (b), which is projected onto the projection screen; (d) storing at least an arrangement position of a specific object in the virtual three-dimensional space; (e) setting a predetermined number of determination points in a predetermined area embracing the arrangement position of the specific object in the image; (f) determining whether or not a first depth value of the predetermined number of determination points set in step (e) is smaller than a second depth value of the specific object; and (g) calculating the degree of hiding of the specific object according to the number of the determination points where it is determined in step (f) that the first depth value is smaller than the second depth value.

In an exemplary three-dimensional image generating method, it is possible to easily generate a display image with consideration given to the degree of hiding, as in the case with an exemplary three-dimensional image generating apparatus.

The above described aspects of the illustrative embodiments will become more apparent from the following detailed description of the illustrative embodiments when taken in conjunction with the accompanying drawings.

DETAILED DESCRIPTION OF THE ILLUSTRATIVE EMBODIMENTS

Figure 1:
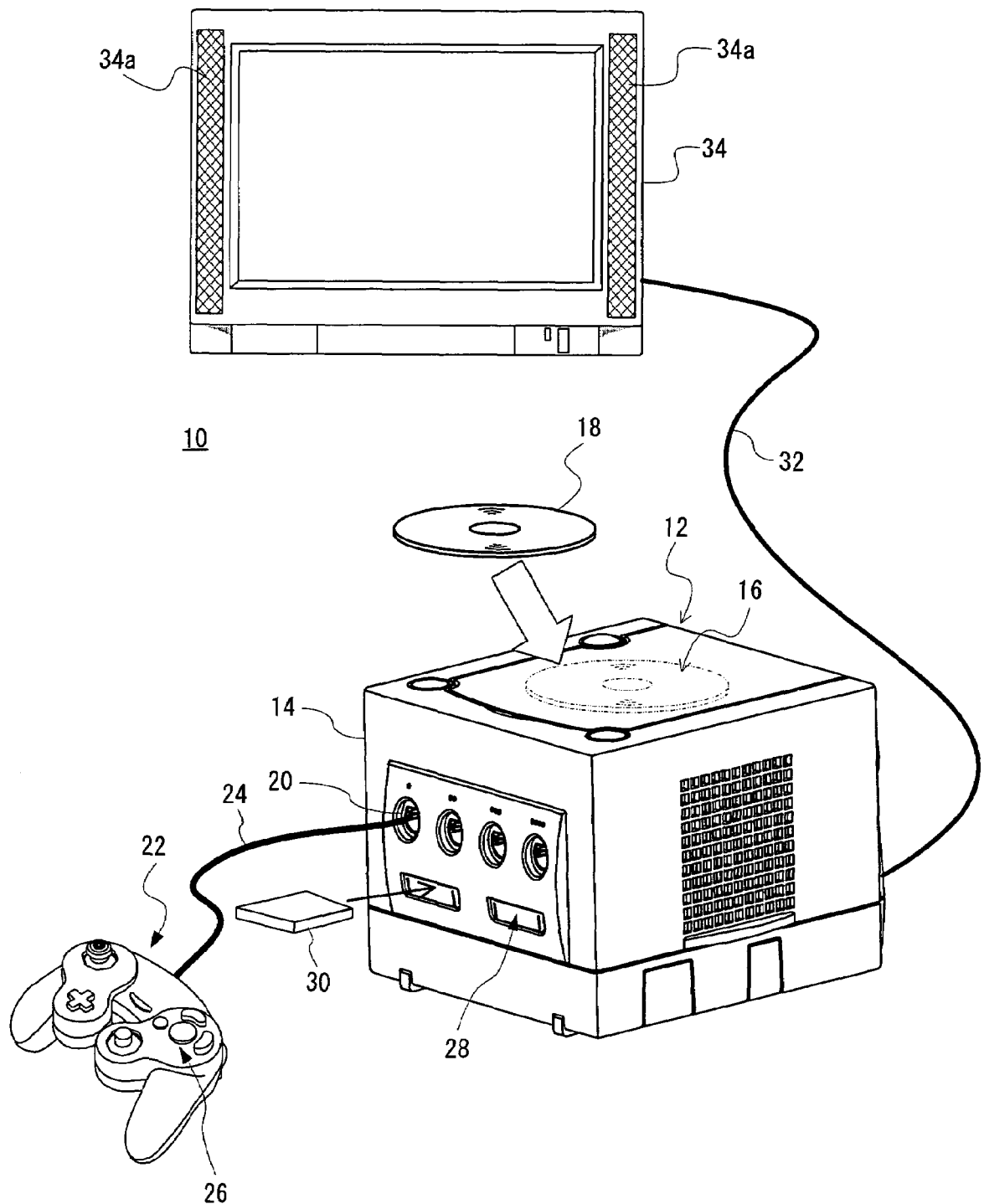
FIG. 1 is an illustrative view showing a game system of one illustrative embodiment.

Referring to FIG. 1, a description will be given as to a video game system 10 which comprises a video game apparatus 12 equipped with a three-dimensional image generating apparatus and a three-dimensional image generating program of one embodiment of an illustrative embodiment. The video game apparatus 12 includes an approximately cubic housing 14, and an optical disk drive 16 is provided on an upper end of the housing 14. Attached to the optical disk drive 16 is an optical disk 18 as an example of information storage medium storing a game program, etc. Provided on a front surface of the housing 14 is a plurality (four in this embodiment) of connectors 20. These connectors 20 are intended to connect a controller 22 to the video game apparatus 12 through a cable 24. In this embodiment, a maximum of four controllers 22 can be connected to the video game apparatus 12.

The controller 22 is provided with an operating part (operating switch) 26 on top surface, bottom surface, or side surface thereof. The operating part 26 includes two analog joysticks, one cross key, a plurality of button switches, etc. One analog joystick is used to input a moving direction and/or moving speed or moving amount of a player object (a moving image object capable of being operated by a player with the controller 22) by a tilted amount and direction of the stick. The other analog joystick controls the movement of a virtual camera according to its tilted direction. The cross switch is used to specify the movement of the player object as a substitute for the analog joystick. The button switch is utilized to specify a motion of the player object, switch the viewpoint of a virtual camera as a three-dimensional image, adjust the moving speed of the player object, etc. The button switch further controls selection of menu options and movement of a pointer or cursor, for example.

Besides, in this embodiment, the controller 22 is connected to the video game apparatus 12 through the cable 24 provided integrally therewith. However, the controller 22 may also be connected to the video game apparatus 12 in another way, for example, in a wireless manner via an electromagnetic wave (radio wave or infrared ray, for example). Also, a specific structure of the operating part 26 of the controller 22 is not limited to the structure of this embodiment but may be arbitrarily changed. For instance, only one analog joystick may be enough or no analog joysticks may be used at all. The cross switch does not always need to be employed.

One or a plurality (two in this embodiment) of memory slots 28 are provided on the front surface of the housing 14 and below the connector 20. A memory card 30 is inserted into the memory slot 28. The memory card 30 is used to load and store temporarily a game program, etc. read out from the optical disk 18 and save game data (game results, for example) of a game played on the game system 10.

An AV cable connector (not illustrated) is provided on a rear surface of the housing 14 of the video game apparatus. The connector is used to connect a monitor 34 to the video game apparatus 12 through the AV cable 32. The monitor 34 is typically a color television receiver. The AV cable 32 inputs a video signal from the video game apparatus 12 to a video input terminal of a color TV and inputs a sound signal to a sound input terminal. Accordingly, a game image of a three-dimensional (3D) video game is displayed on a screen of the color TV (monitor) 34, and stereo game sounds such as game music and sound effects are output from speakers 34a on both sides.

In the game system 10, for a user or a game player to play a game (or another application), the user firstly turns on the video game apparatus 12, next selects an appropriate optical disk 18 in which the video game (or another application to be played) is stored, and then loads the optical disk 18 into the disk drive 16 of the video game apparatus 12. Accordingly, the video game apparatus 12 starts executing the video game or another application based on software stored in the optical disk 18. The user operates the controller 22 to provide input to the video game apparatus 12. For example, the game or another application is started by manipulating some section of the operating part 26. By manipulating another section of the operating part 26, it is possible to move a moving image object (player object) in a different direction or change the viewpoint of the user (camera position) in a game world.

Figure 2:
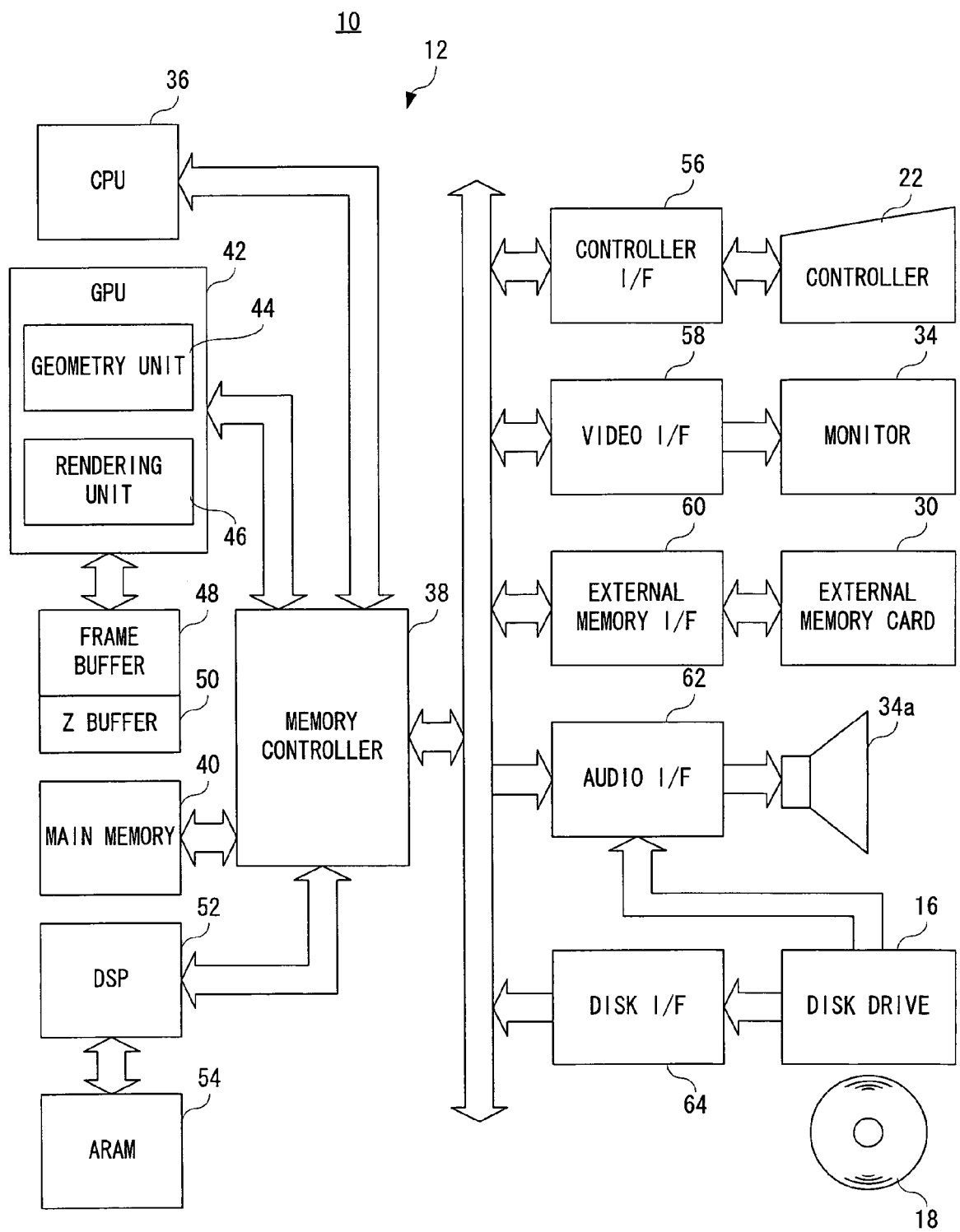
FIG. 2 is a block diagram showing an exemplary electric structure of the game system presented in FIG. 1.

FIG. 2 is a block diagram showing an electrical structure of the video game system 10 of FIG. 1 illustrative embodiment. The video game apparatus 12 is provided with a central processing unit (hereinafter referred to as "CPU") 36. The CPU 36 is also called computer or processor, and responsible for entirely controlling the video game apparatus 12. The CPU 36 or computer functions as a game processor and is connected with a memory controller 38 via a bus. The memory controller 38 mainly controls writing to and reading from a main memory 40 connected via the bus, under control of the CPU 36. The memory controller 38 is connected with a GPU (Graphics Processing Unit) 42.

The GPU 42 constitutes a part of a rendering means and consists of a single-chip ASIC, for example. It receives a graphics command (rendering order) from the CPU 36 via the memory controller 38, and generates a three-dimensional (3D) game image according to the command by using a geometry unit 44 and a rendering unit 46. More specifically, the geometry unit 44 carries out coordinate operation processes such as rotation, movement and transformation of various objects and objects in a three-dimensional coordinate system (consisting of a plurality of polygons. The polygon denotes a plane defined by at least three vertex coordinates.) The rendering unit 46 subjects each polygon of various objects to image generating processes such as pasting a texture (pattern image). Accordingly, 3D image data to be displayed on the game screen is generated by the GPU 42 and stored in a frame buffer 48.

Incidentally, the GPU 42 obtains data (primitives or polygons, textures etc.) required for the GPU 42 to execute the rendering command, from the main memory 40 via the memory controller 38.

The frame buffer 48 is a memory for rendering (accumulating) one frame of image data in a raster scan monitor 34, for example, and is updated by the GPU 42 on a frame-by-frame basis. More specifically, the frame buffer 48 stores color information of an image in orderly sequence on a pixel-by-pixel basis. The color information here is data of R, G, B and A, and for example, 8-bit R (red) data, 8-bit G (green) data, 8-bit B (blue) data and 8-bit A (alpha) data. Also, the A data is data on mask (mat image). A video I/F 58 described later reads out the data from the frame buffer 48 via the memory controller 38, thereby displaying a 3D game image on the screen of the monitor 34.

In addition, a Z buffer 50 has a capacity equivalent to the number of pixels corresponding to the frame buffer 48 X the number of bits of depth data per pixel, and stores depth information or depth data (Z value) of a dot corresponding to each storage position in the frame buffer 48.

Both the frame buffer 48 and the Z buffer 50 may be formed with use of one part of the main memory 40, and also may be provided within the GPU 42.

The memory controller 38 is also connected to an ARAM 54 via a DSP (Digital Signal Processor) 52. Thus, the memory controller 38 controls not only the main memory 40 but also writing to and/or reading from the ARAM 54 as a sub-memory.

The DSP 52 functions as a sound processor and generates audio data corresponding to sounds, voice or music required for the game by using sound data (not illustrated) stored in the main memory 40 or audio waveform data (not illustrated) written into the ARAM 54.

The memory controller 38 is further connected via the bus to interfaces (I/F) 56, 58, 60, 62 and 64. The controller I/F 56 is an interface for the controller 22, and provides an operating signal or data from the operating part 26 of the controller 22 to the CPU 36 through the memory controller 38. The video I/F 58 accesses the frame buffer 48 to read out the image data generated by the GPU 42 and provides an image signal or image data (digital RGBA pixel values) to the monitor 34 via the AV cable 32 (FIG. 1).

The external memory I/F 60 links a memory card 30 (FIG. 1) inserted into the front surface of the video game apparatus 12, with the memory controller 38. This allows the CPU 36 to write data into the memory card 30 or read out data from the memory card 30 via the memory controller 38. The audio I/F 62 receives audio data provided by the DSP 52 via the memory controller 38 or an audio stream read out from the optical disk 18, and provides the speaker 34a of the monitor 34 with an audio signal (sound signal) corresponding to it.

Furthermore, the disk I/F 64 connects the disk drive 16 to the memory controller 38, which causes the CPU 36 to control the disk drive 16. Program data, texture data and the like read out by the disk drive 16 from the optical disk 18 are written into the main memory 40 under control of the CPU 36.

Figure 3:
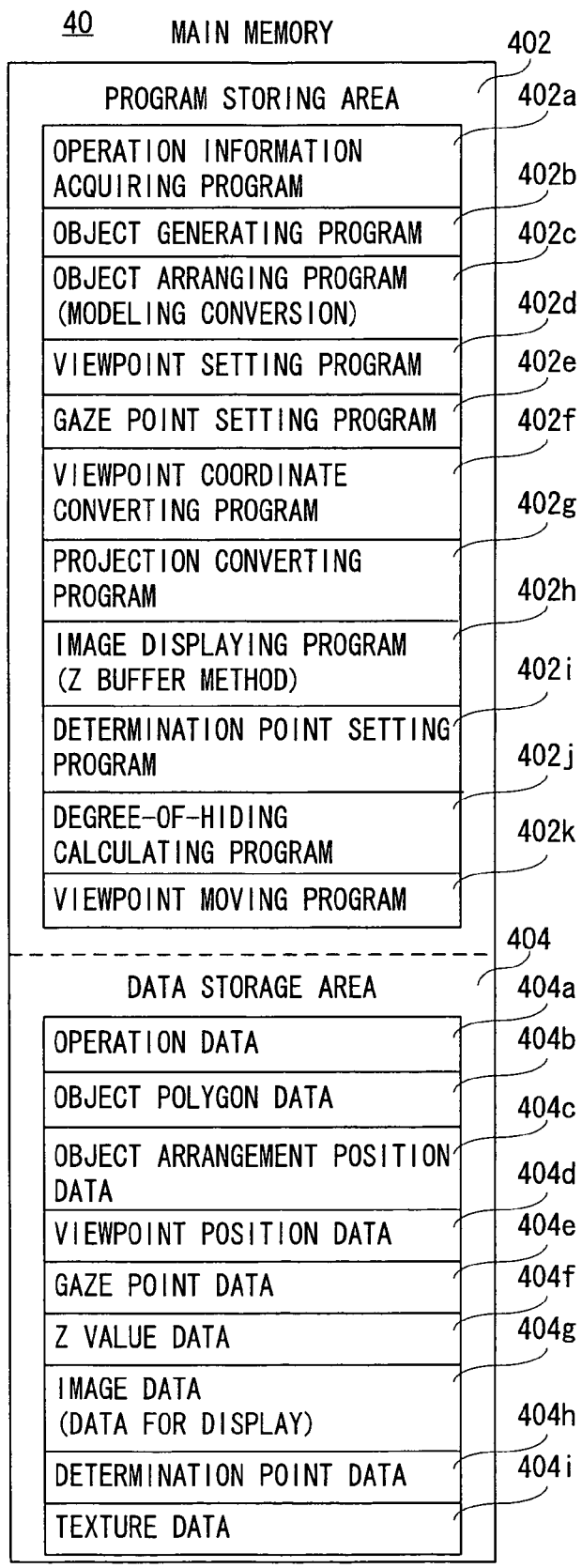
FIG. 3 is an illustrative view showing an exemplary memory map of a main memory presented in FIG. 2.

FIG. 3 shows an exemplary memory map of the main memory 40. The main memory 40 includes a program storing area 402 and a data storing area 404. The program storing area 402 stores an exemplary three-dimensional image generating program. The three-dimensional image generating program consists of an operation information acquiring program 402a, an object generating program 402b, an object arranging program 402c, a viewpoint setting program 402d, a gaze point setting program 402e, a viewpoint coordinate converting program 402f, a projection converting program 402g, an image displaying program 402h, a determination point setting program 402i, a degree-of-hiding calculating program 402j and a viewpoint moving program 402k.

The operating information acquiring program 402a is a program for acquiring information on a player's operation (operation input), which detects operation data (operation signal) input from the controller 22 via the controller I/F 56 and stores it in the data storing area 404. The object generating program 402b is a program for generating a virtual three-dimensional space such as a virtual game space and generating such objects as player object, non-player object, item object and background object existing in the virtual three-dimensional space.

The player object here means an object which moves, or the like, within the virtual three-dimensional space according to the player's operation and applies to moving image objects representing persons, animals animated cartoon characters, etc. Also, the non-player object mean an object which moves according to a program, not by the player's operation, and applies to moving image objects representing persons, animals, animated cartoon characters, etc., as with the player object. The item object refers to an object representing an item (such as weapon, medicine, food, gold coin, etc.) acquired or owned by the player object or the non-player object. The background object denotes an object representing a background such as wall, floor (ground), pillar, tree, etc.

The object arranging program 402c is a program for arranging the objects generated under the object generating program 402b within the virtual three-dimensional space, according to the player's operation (operation data) or in an automatic manner. That is, it is a program for executing a modeling conversion process. The viewpoint setting program 402d is a program for setting (controlling) the position (viewpoint position) and orientation of the viewpoint (virtual camera) within the virtual three-dimensional space. The viewpoint coordinate converting program 402f is a program for converting a coordinate of a three-dimensional image seen from the viewpoint (photographed by the virtual camera) into the viewpoint coordinate or camera coordinate in such a manner that the viewpoint position (virtual camera position) becomes the point of origin.

The projection converting program 402g is a program for projecting (for example, perspectively projecting) the image whose coordinate is converted by the viewpoint coordinate converting program 402f, onto a screen (projection screen or virtual screen) in which the viewpoint position is centered. The image displaying program 402f is a program for displaying on the monitor 34 the image projected onto the projection screen by the projection converting program 402g. In this illustrative embodiment, the image (game image) on the projection screen is displayed on the monitor 34 by the Z buffer method.

The determination point setting program 402i is a program for setting a determination point for calculation of a degree that a specific (predetermined) object is hidden by another object (the degree of hiding). For instance, a plurality of determination points are set as per a predetermined rule in an area adjacent to and embracing a specific object such as a player object. This setting method will be described later in detail. The degree-of-hiding calculating program 402j is a program for calculating the degree of hiding of a specific object such as a player object. That is, in case where some object (hiding material) exists between the virtual camera and the specific object, the degree of hiding is calculated. The viewpoint moving program 402k is a program for moving and controlling the viewpoint within the virtual three-dimensional space.

In addition, although not illustrated, the program storing area 402 also stores a main processing program for a game (virtual game) executed on the video game apparatus 12, a game music reproducing program for outputting sounds (music) required for the virtual game, a backup processing program for storing (backing up) game data such as the data of a game still in progress and the final outcomes of the game.

Moreover, the data storing area 404 stores such data as operation data 404a, object polygon data 404b, object arrangement position data 404c, viewpoint position data 404d, gaze position data 404e, Z value data 404f, image data 404g, determination point data 404h, texture data 404i, etc.

The operation data 404a is operation data acquired according to the operation information acquiring program 402a. The object polygon data 404b is polygon data for generating such objects as described above. The object arrangement position data 404c is data on the current position or arrangement position (three-dimensional coordinate) of an object existing within a virtual three-dimensional space, and is stored in association with each object.

The viewpoint position data 404d is data on the position (three-dimensional coordinate) of a viewpoint (virtual camera) in a virtual three-dimensional space. The gaze point data 404e is data on the gaze position (three-dimensional coordinate) of the virtual camera. The Z value data 404f is numeric data indicating a Z value of a specific object. In this illustrative embodiment, however, a minimum value is selected out of Z values of the specific object, and its numeric data is stored. This is because the degree of hiding may not be accurately determined depending on the orientation of the specific object in case where a Z value on a specific position (body part or spot) in the object is to be fixedly selected.

The image data 404g is data on an image to be displayed on the monitor 34. The determination point data 404h is coordinate data (two-dimensional coordinate data) on a point (determination point) set on the projection screen in order to determine the degree of hiding of a specific object. The texture data 404i is texture data for generating the above mentioned objects, and is pasted to the above mentioned object polygon data 404b.

Although not illustrated, the data storing area 404 also stores sound data such as music (BGM) and sound effects (music) played during the game, and game data and flag data generated with the progress of the game, etc.

Figure 4:
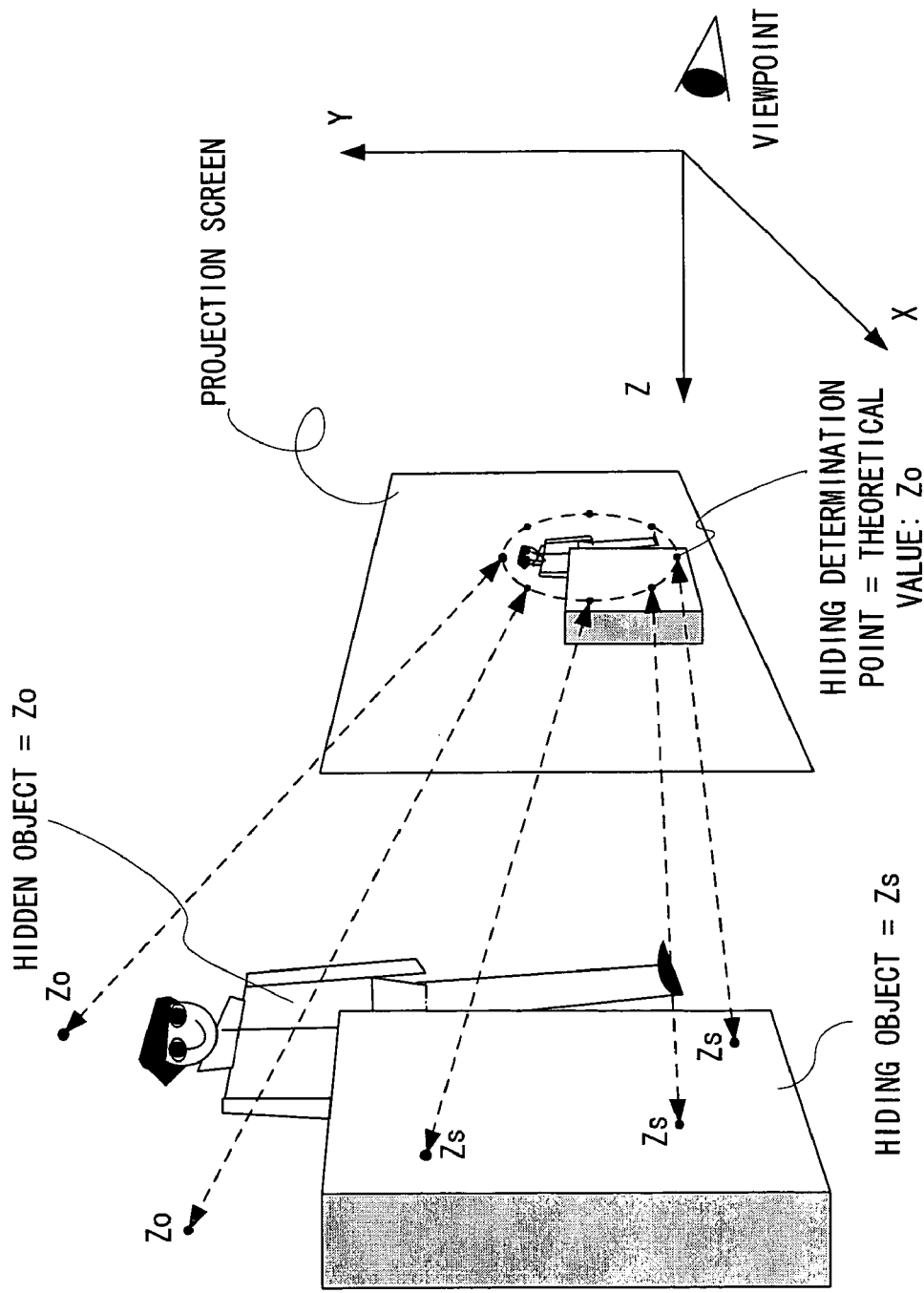
FIG. 4 is an illustrative view showing one example of a virtual three-dimensional space developed on a video game apparatus presented in FIG. 1.

For instance, in displaying on the monitor 34 an image of a virtual three-dimensional space as shown in FIG. 4, the objects existing (modeled) in the virtual three-dimensional space are projected onto the projection screen because the display screen of the monitor 34 is two-dimensional. More specifically, a person object, wall object, etc. in an area visible from the viewpoint are converted into a viewpoint coordinate (camera coordinate) in which the viewpoint is centered, and then are projected and converted. The projected and converted image is displayed on the monitor 34.

Here, in a general game apparatus, if some hiding material exists between a person object (player object) and a virtual camera, the position of the virtual camera is moved (rotary movement, etc.) in order to avoid the player object from being hidden by the hiding material.

However, if there exist a large amount of hiding material that hides the player object, the position of the camera is frequently moved and thus the game image is updated at short intervals, which may cause a nuisance for the player. Also, even if one portion of the player object is hidden, it may be desirable in some cases to display the state as a game image for a scenic effect on the game. Accordingly, it cannot be said that moving the virtual camera at all times is appropriate even in case where some hiding material exists between the player object and the virtual camera.

In this illustrative embodiment, therefore, a proportion (degree of hiding) of a specific object such as a player object which is hidden by hiding material is calculated and the virtual camera is moved according to the degree of hiding. Also, if it is desired to produce a scenic effect such as where a spotlight shines from behind the player object, for example, it is possible to set the specific object to spotlight (point-source light) and change the brightness of light from the point-source light according to the degree of hiding in a case where the player object hides the light. This will be more specifically described below.

Figure 5:
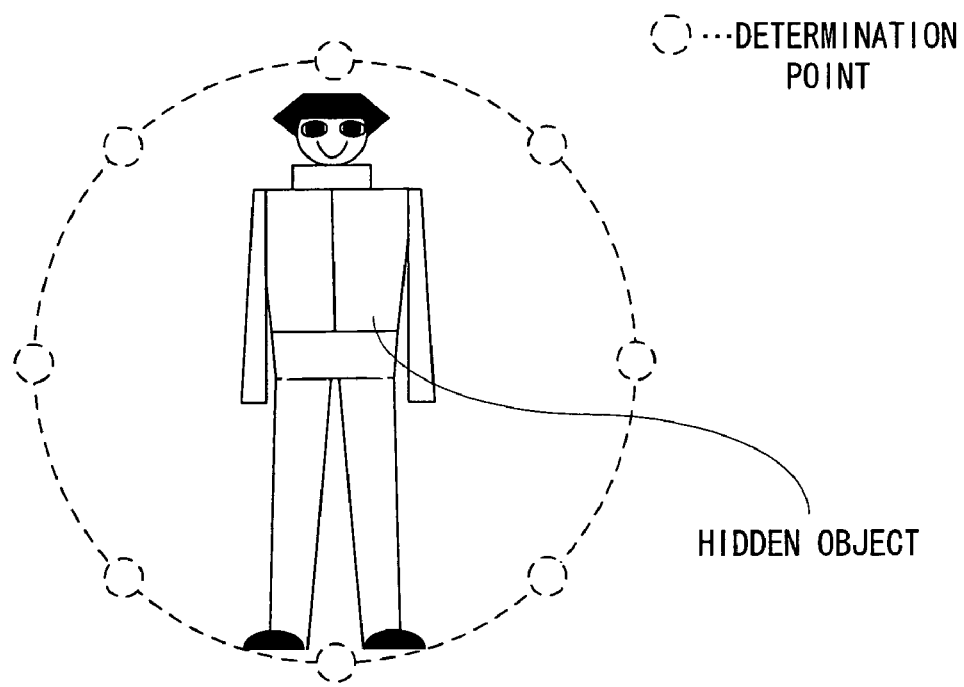
FIG. 5 is illustrative views showing one example of a method for setting determination points in case where no hiding material exists between a viewpoint and a hidden object.
Figure 5:
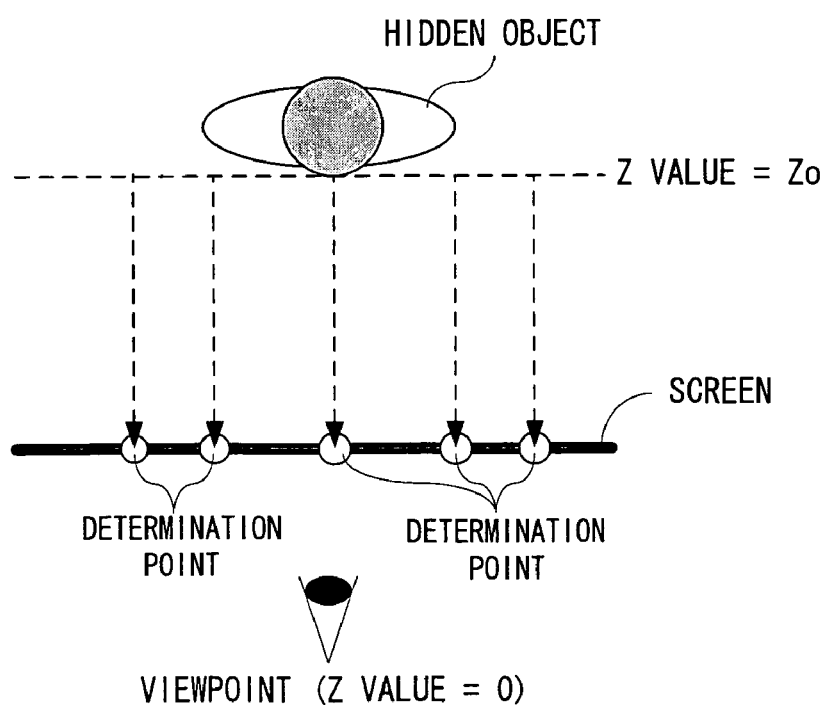

First, a description will be given as to the setting of determination points, showing the case where no hiding material exists between a person object (specific object) and a viewpoint (virtual camera). FIG. 5 (A) is an illustrative view showing the person object in the virtual three-dimensional space seen from the viewpoint. As illustrated in FIG. 5 (A), a predetermined number (eight in this illustrative embodiment) of determination points for determining the degree of hiding are set corresponding to the person object, i.e., the specific object (hereinafter referred to as "hidden object"). In this illustrative embodiment, however, the determination points are set with respect to the hidden object which has been projected and converted. That is, the determination points are set on the projection screen. The determination points are indicated by dotted lines in FIG. 5 (A).

More specifically, the predetermined number of determination points are arranged with each predetermined spacing (predetermined center angle) in an orbit (circumference) of a circle whose radius is established according to size of the hidden object. Also, the size of the circle for setting determination points is determined in such a manner that it becomes adjacent to and embraces the hidden object.

However, the position coordinate of the hidden object is determined by its center (in case of a person object, the waist position of the person). This is because a plurality of determination points are arranged on the circumference of the circle and the circle is adjacent to and embraces the hidden object. Therefore, if the hidden object is a person object, the radius of the circle is defined as approximately half of its stature (height).

Additionally, the position coordinate (three-dimensional coordinate) of a moving image object such as a hidden object in the virtual three-dimensional space is monitored at all times. It is thus possible to easily find the position coordinate of the hidden object after the three-dimensional coordinate has been converted into a camera coordinate and then projected and converted.

FIG. 5 (B) is a top view of the viewpoint, projection screen and hidden object, in a state where no hiding material exists in the virtual three-dimensional space as shown in FIG. 5 (A). Referring to FIG. 5 (B), the determination points are set on the projection screen as described above. Also, a Z value of the viewpoint is set to "0" and a Z value of the hidden object at that time is assumed to be "Zo". Since there is no hiding material between the viewpoint and the hidden object here, a Z value stored in the Z buffer 50 corresponding to the positions of the set determination points becomes equal to or larger than the Z value (Zo) of the hidden object.

The Z value (Zo) of the hidden object here is, as described above, a Z value of a position to which the position coordinate of the hidden object is moved in parallel in such a manner as to be most closely to the virtual camera (viewpoint), out of the parts (surfaces or spots) of the hidden objects. The Z value (Zo) of the hidden object will be hereinafter called "reference Z value" for convenience of description.

Figure 6:
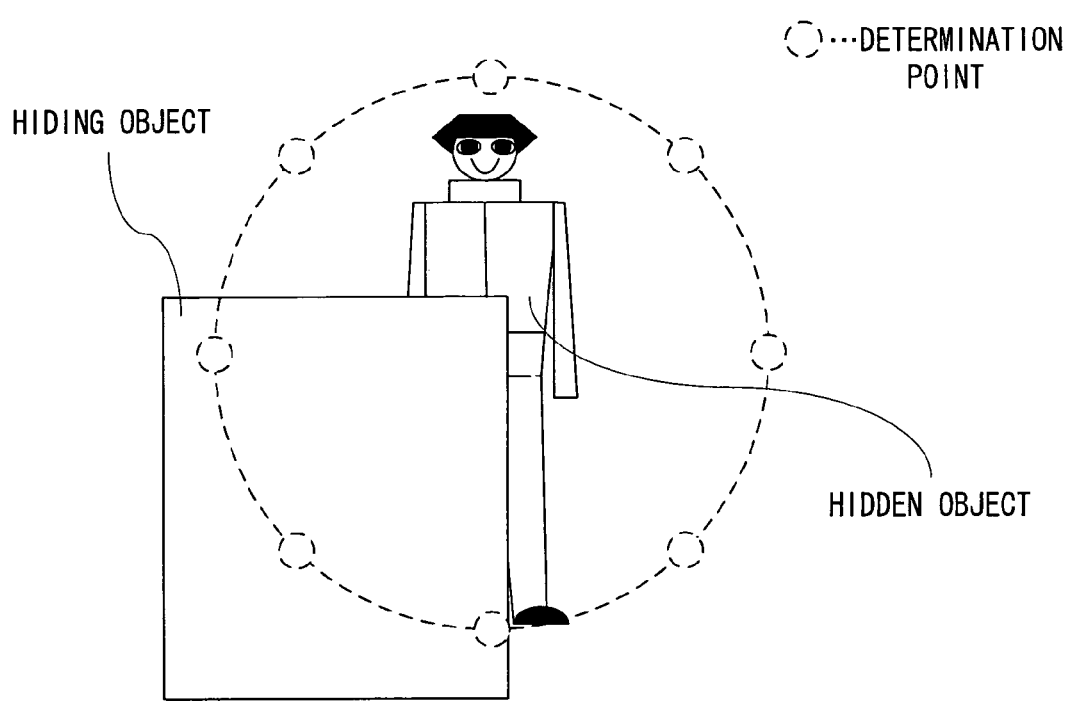
FIG. 6 is illustrative views showing one example of a degree of hiding in case where a hiding material exists between the viewpoint and the hidden object.
Figure 6:
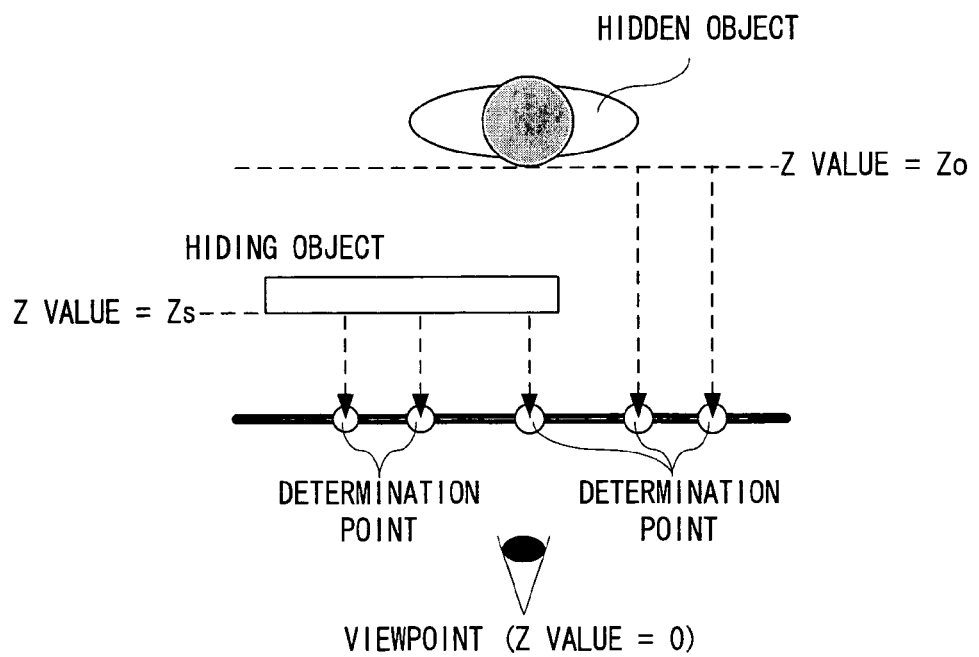

FIG. 6 is illustrative views showing one example of the case where some hiding material exists between the hidden object and the viewpoint. However, FIG. 6 (A) is an illustrative view showing the hiding object and the hidden object in the virtual three-dimensional space seen from the viewpoint, as in the case of FIG. 5 (A). In addition, FIG. 6 (B) is an illustrative view of the viewpoint, projection screen and hidden object in the three-dimensional space seen from the top in such a state as shown in FIG. 6 (A). As shown in FIG. 6 (A), the hiding material (hiding object) is arranged in such a manner as to lie diagonally forward right of the hidden object and hide the hidden object. Additionally, a description of the setting of the determination points is omitted here because it is the same as that presented with use of FIG. 5 (A). In this case, as understood from FIG. 6 (B), there exist some determination points whose Z value is not the reference Z value but a Z value (Zs) of the hiding object.

More specifically, as can be seen well from FIG. 6 (A), there exist three determination points whose Z value becomes "Zs", out of eight determination points. Additionally, it is apparent from FIG. 6 (B) that, in the determination points whose Z value becomes "Zs", the Z value is smaller than the reference Z value. In this way, if some hiding object exists between the viewpoint and the hidden object, the hidden object may be hidden by the hiding object and a degree of hiding H is calculated according to Equation 1 where the number of all determination points is M and the number of determination points having a Z value smaller than the reference Z value is N.

$$H=N/M \qquad \text{[Equation 1]}$$

Therefore, in the example shown in FIG. 6, the degree of hiding H becomes 3/8 (=0.375). Incidentally, in the example shown in FIG. 5, N=0 and thus the degree of hiding H becomes "0" as well.

Figure 7:
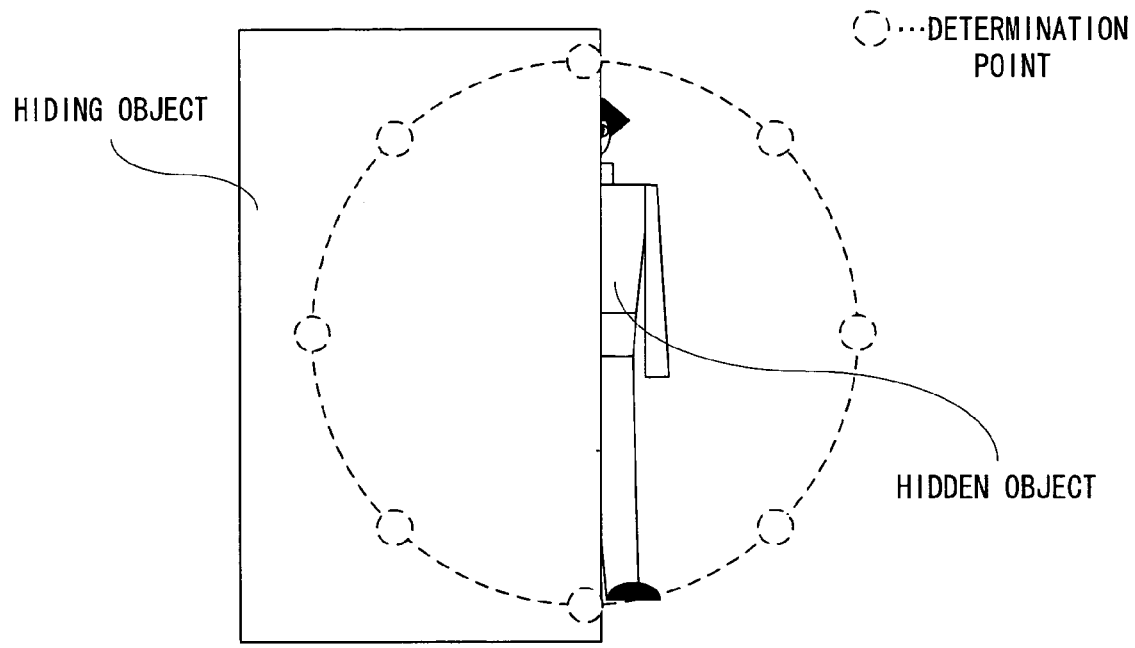
FIG. 7 is illustrative views showing another example of the degree of hiding in case where a hiding material exists between the viewpoint and the hidden object.
Figure 7:
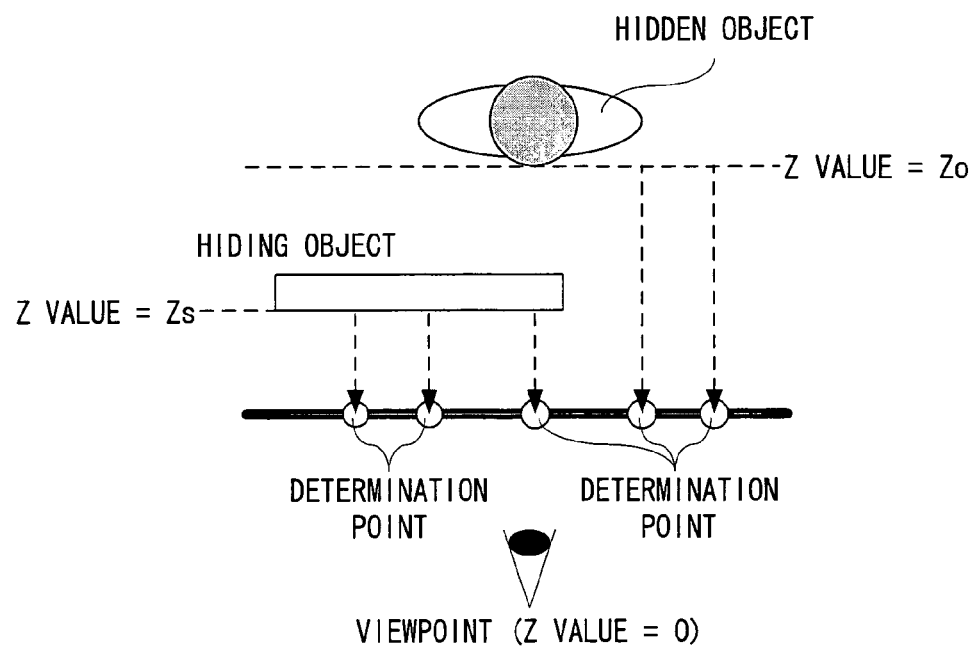

In addition, FIG. 7 is illustrative views showing another example of the case where some hiding material exists between the hidden object and the viewpoint. However, FIG. 7 (A) is an illustrative view showing the hiding object and the hidden object in the virtual three-dimensional space seen from the viewpoint, as in the case of FIG. 5 (A). Also, FIG. 7 (B) is an illustrative view of the viewpoint, projection screen and hidden object in the virtual three-dimensional space seen from the top, in such a state as shown in FIG. 7 (A). As shown in FIG. 7 (A) and FIG. 7 (B), the hiding object exists between the viewpoint and the hidden object in such a manner as to hide a right half (right side of the body) of the hidden object. In this case, since there exist five determination points whose the Z value becomes "Zs", the degree of hiding H becomes 5/8 (=0.625) according to Equation 1.

Here, the hidden object is not hidden at all in the example shown in FIG. 5 and also only the lower right side of the hidden object is hidden in the example shown in FIG. 6. In these examples, there is no harm to the player's operation in the progress of the game, and thus the viewpoint does not need to be changed. In the example shown in FIG. 7, however, the entire right side of the hidden object is hidden and the player would have trouble in continuing to play the game. Therefore, it is conceivable that the viewpoint needs to be moved to decrease the degree of hiding of the hidden object.

Some ways of moving the viewpoint are conceivable, such as rotating and moving the viewpoint with the gaze point centered, bringing the viewpoint closer to the hidden object, and making the viewpoint cut in between the hiding object and the hidden object. These ways are already well-known and thus detailed descriptions on them will be omitted.

Figure 8:
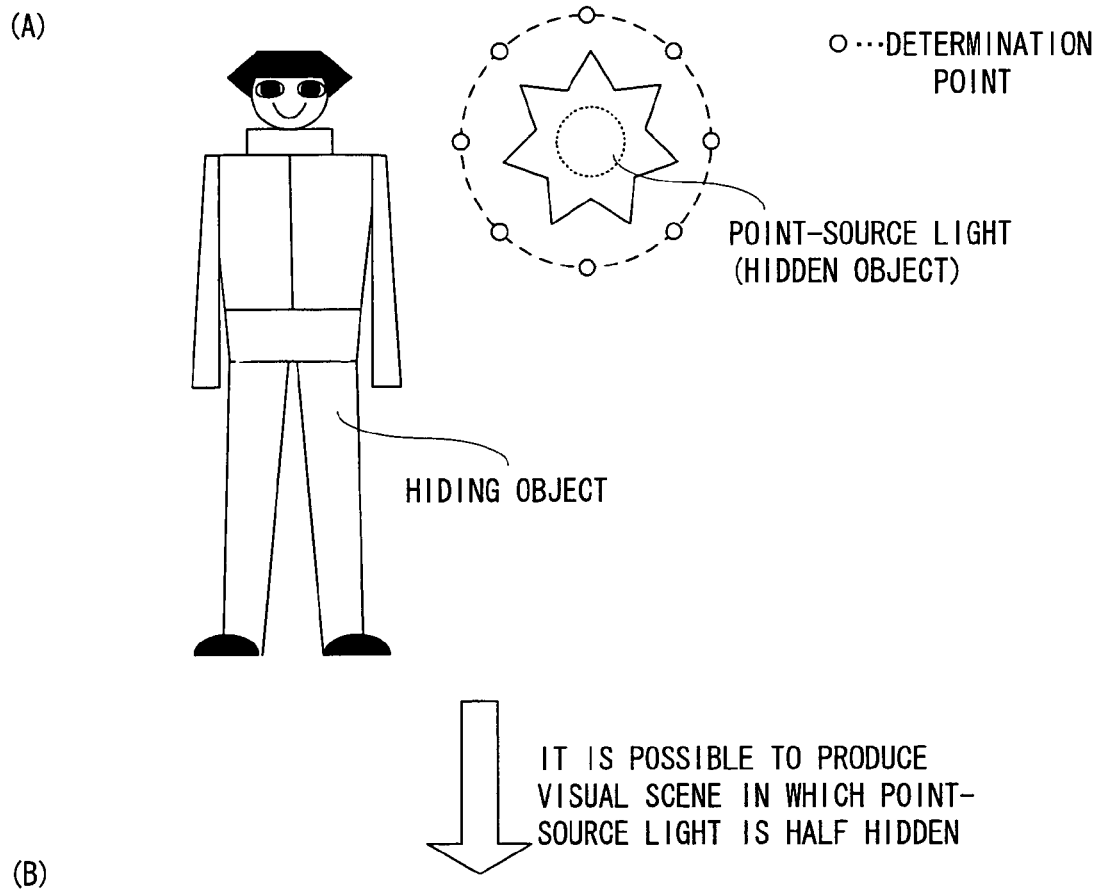
FIG. 8 is illustrative views showing other examples of the degree of hiding in case where no hiding material exists between the viewpoint and the hidden object and in case where a hiding material exists between the same.
Figure 8:
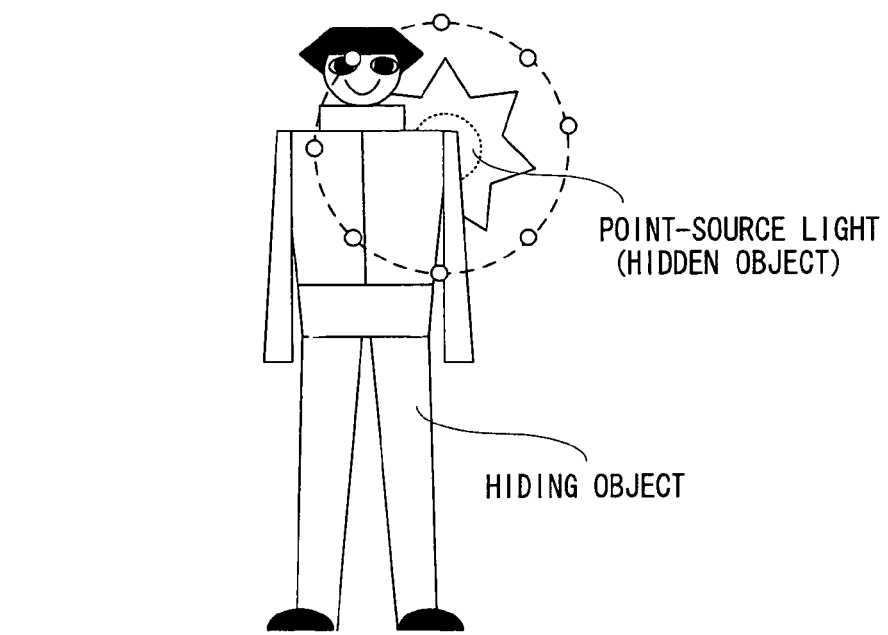

FIG. 8 (A) and FIG. 8 (B) are illustrative views showing the hiding object (the person object here) and the hidden object (the light source object here) seen from the viewpoint in the virtual three-dimensional space. Incidentally, the determination points are shown by full lines in FIG. 8 (A) and FIG. 8 (B) for convenience in making the drawings. As described above, however, determination points are set with respect to a projected and converted hidden object. In the case shown in FIG. 8 (A), the hidden object such as a point-light source (spotlight) is not hidden by the hiding object such as a person object. Thus, in this case, the point-light source is illuminated at maximum brightness (maximum brightness within the range of set value), for example. On the other hand, in case where the hidden object hides the hiding object as shown in FIG. 8 (B), it is conceivable to change the brightness of the point-light source according to the degree of hiding. This makes it possible to display such an image where light shines from behind the hiding object and produces a more real scenic effect as compared to the case where the viewpoint is just moved.

In this illustrative embodiment, assuming that the brightness is 100% in the case where the degree of hiding is "0", the brightness is changed to a value obtained by multiplying the value of 100% by a proportion which is determined by a degree of hiding N calculated according to Equation 1 (1−N). That is, brightness P is calculated according to Equation 2.

$$P(\%)=(1-N)\times 100 \qquad \text{[Equation 2]}$$

Figure 9:
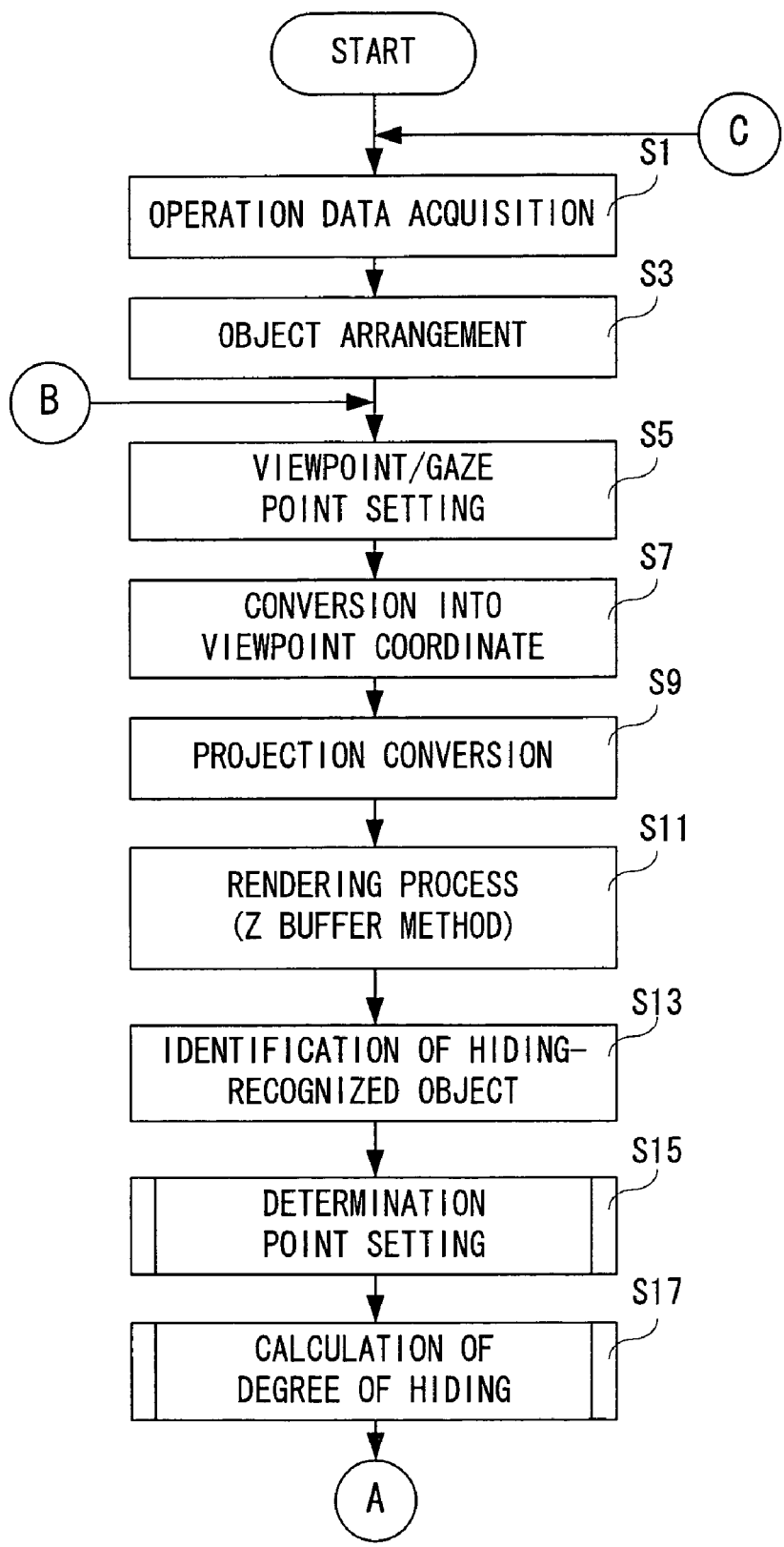
FIG. 9 is a flowchart showing one part of an exemplary three-dimensional image generating process of a CPU illustrated in FIG. 2.
Figure 10:
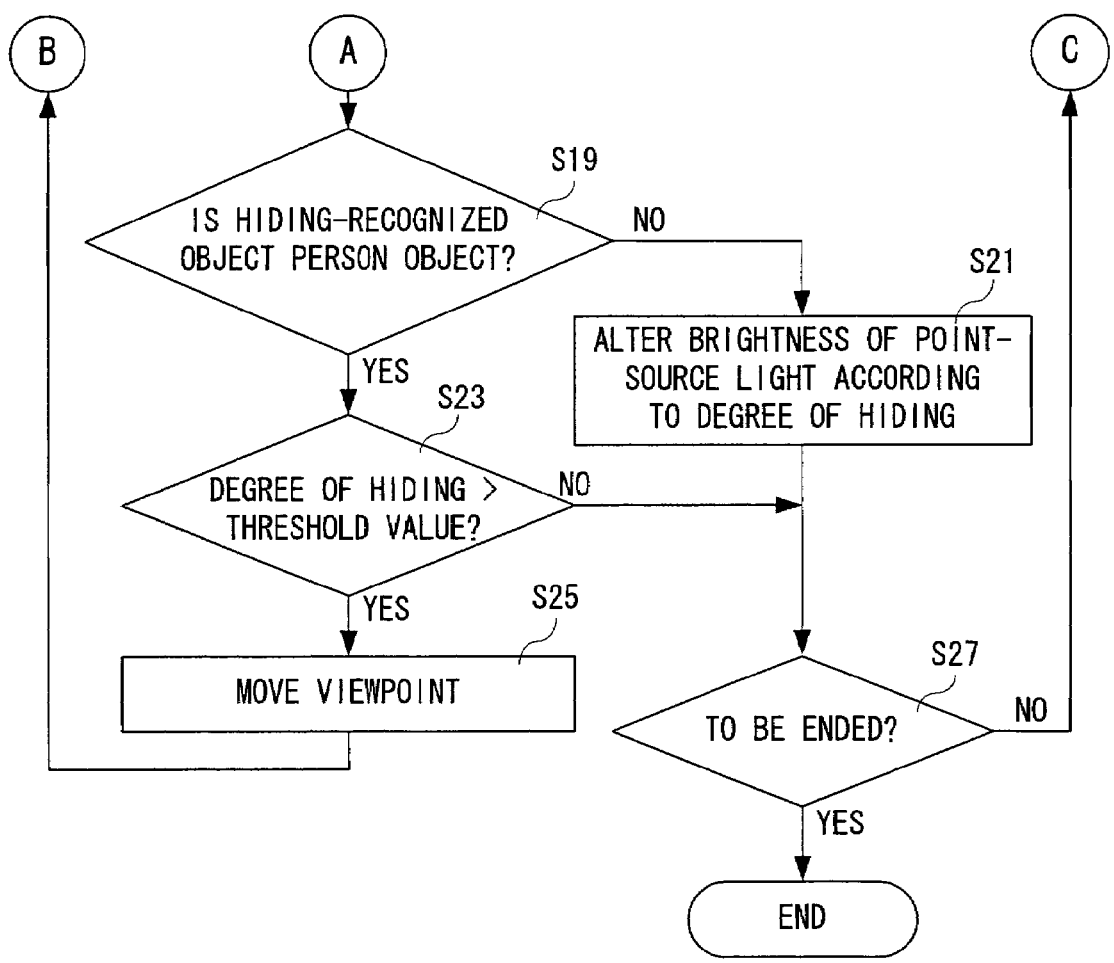
FIG. 10 is a flowchart showing another part of the exemplary three-dimensional image generating process of the CPU illustrated in FIG. 2, which is continued from FIG. 9.

More specifically, the CPU 36 shown in FIG. 2 executes a three-dimensional image generating process according to the flowcharts described in FIG. 9 and FIG. 10. When it has started the three-dimensional image generating process, the CPU 36 acquires operation data in a step S1. More specifically, the CPU 36 detects operation data input from the controller 22 via the controller I/F 56 and controls the memory controller 38 to store the data in the data storing area 404 of the main memory 40. If no operation data is detected, however, no operation data is stored.

In a next step S3, objects are arranged according to the operation data (the player's operation input) or in an automatic manner. That is, such objects as a player object, a non-player object, an item object, a background object, etc. are modeled in the virtual three-dimensional space. At a start of a game, however, the objects are modeled in preset three-dimensional positions. In a succeeding step S5, a viewpoint and a gaze point are set. That is, the position and orientation of a virtual camera are determined. Incidentally, the positions and orientations of the virtual camera may be prepared in advance, but also may be changed by the player's operation. Then, in a step S7, the objects are converted into viewpoint coordinates (camera coordinates) where the viewpoint (virtual camera) is centered (0, 0, 0).

Subsequently, in a step S9, the objects are projected and converted. That is, an image for display on the monitor 34 is projected onto the projection screen. At this time, color information (R, G, B, A) of each pixel of the image to be displayed is stored in the frame buffer 48, and a Z value of each pixel is stored in the Z buffer 50. In a next step S11, the rendering process is performed by the Z buffer method. That is, image data 404g is stored (generated) in the data storing area 404. After that, although not illustrated, the image data 404g is read out by the memory controller 38 under instructions from the CPU 36, and is output to the monitor 34 via the video I/F 58. This causes the game image to be displayed on the monitor 34.

In a step S13, a hiding-recognized object, i.e., a hidden object is identified. In this illustrative embodiment, the hidden object is decided in advance for each scene according to the progress of the game and is identified among the objects projected onto the projection screen. When the hidden object has been identified, a determination point setting process (see FIG. 11) described later is performed in a step S15, and a degree-of-hiding calculation process (see FIG. 11) is carried out in a step S17.

As shown in FIG. 10, it is determined in a next step S19 whether or not the object identified in the step S13 is a person object. If "NO" in the step S19, that is, if the identified object is a point-light source, the brightness of the point-light source is changed in a step S21 according to the degree of hiding calculated in the step S17, that is, the brightness is changed to the brightness calculated according to Equation 2, and the process moves on to a step S27.

On the other hand, if "YES" in the step S19, that is, if the specified object is a person object, it is determined in a step S23 whether or not the degree of hiding is larger than a threshold value. If the degree of hiding is larger than the threshold value, "YES" is determined in the step S23, and the viewpoint is moved in a step S25 and the process returns to the step S5 shown in FIG. 9. However, if the degree of hiding is the threshold value or less, "NO" is determined in the step S23 and the process goes to a step S27. That is, the steps S1 to S19, S23 and S25 are repeated and the viewpoint is continuously moved until the degree of hiding becomes the threshold value or less. Therefore, by setting the amount (distance) of moving the viewpoint in a relatively small unit, it is possible to generate and display a partly hidden image, that is, an image where a specific object is hidden to some degree, not a rapidly transformed image.

In a step S27, it is determined whether or not to end the image generation. That is, it is determined whether or not an instruction for end of the game has been given by the player or the game is over. If "NO" in the step S27, that is, the image generation is not to be ended, the process returns to the step S1 shown in FIG. 9. On the contrary, if "YES" in the step S27, that is, if the image generation is to be ended, the three-dimensional image generating process is terminated.

Figure 11:
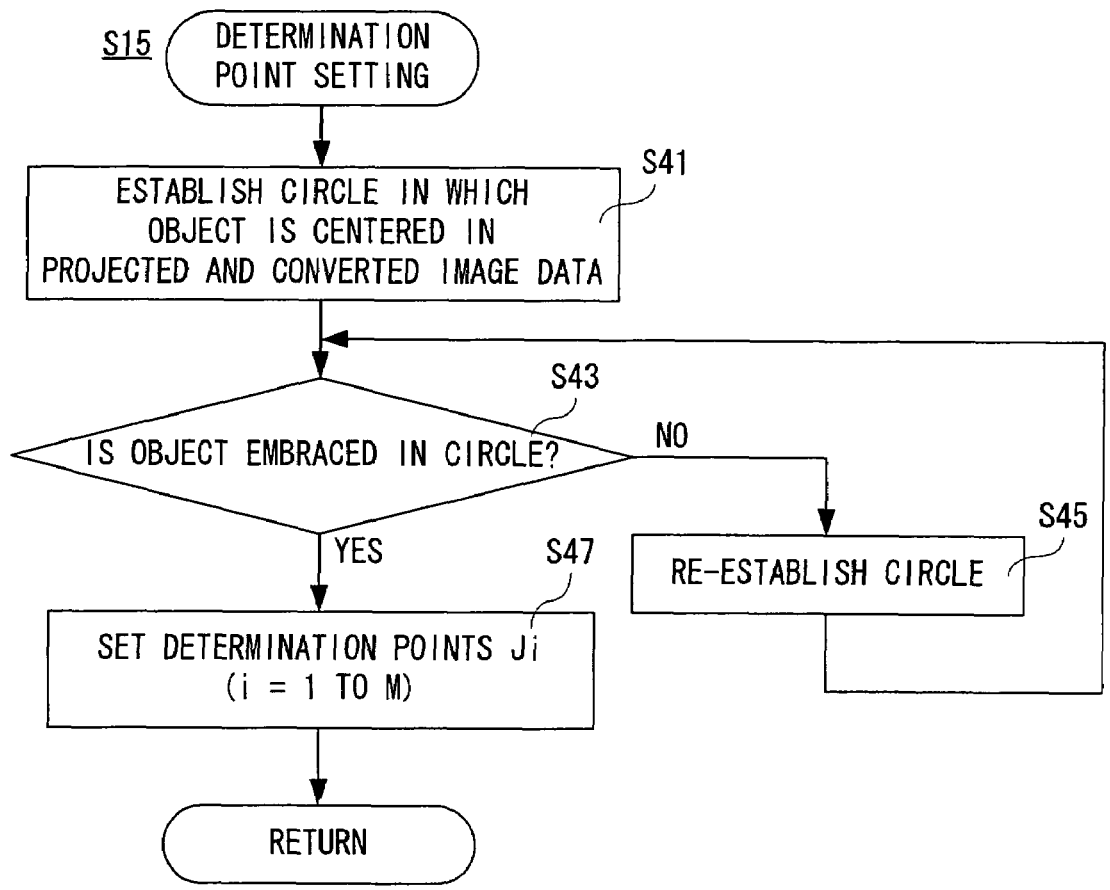
FIG. 11 is a flowchart showing an exemplary determination point setting process of the CPU illustrated in FIG. 2.

FIG. 11 is a flowchart showing the determination point setting process in the step S15 shown in FIG. 9. Referring to FIG. 11, when it has started the determination point setting process, the CPU 36 establishes a circle in which an object is centered in projected and converted image data in a step S41. As described above, the circle in which the position coordinate of the specific object is centered and whose radius is defined by the height of the specific object is established.

In a succeeding step S43, it is determined whether or not the object is embraced in the circle. If "NO" in the step S43, that is, if the object is not embraced in the circle, the circle is re-established in a step S45 and the process returns to the step S43. In the step S45, for example, the radius (or diameter) of the circle is made larger by a preset length.

On the other hand, if "YES" in the step S43, that is, if the object is embraced in the circle, determination points Ji (i=1 to M) are set in a step S47, that is, determination point data 404h is stored in the data storing area 404, and the determination point setting process is returned.

Figure 12:
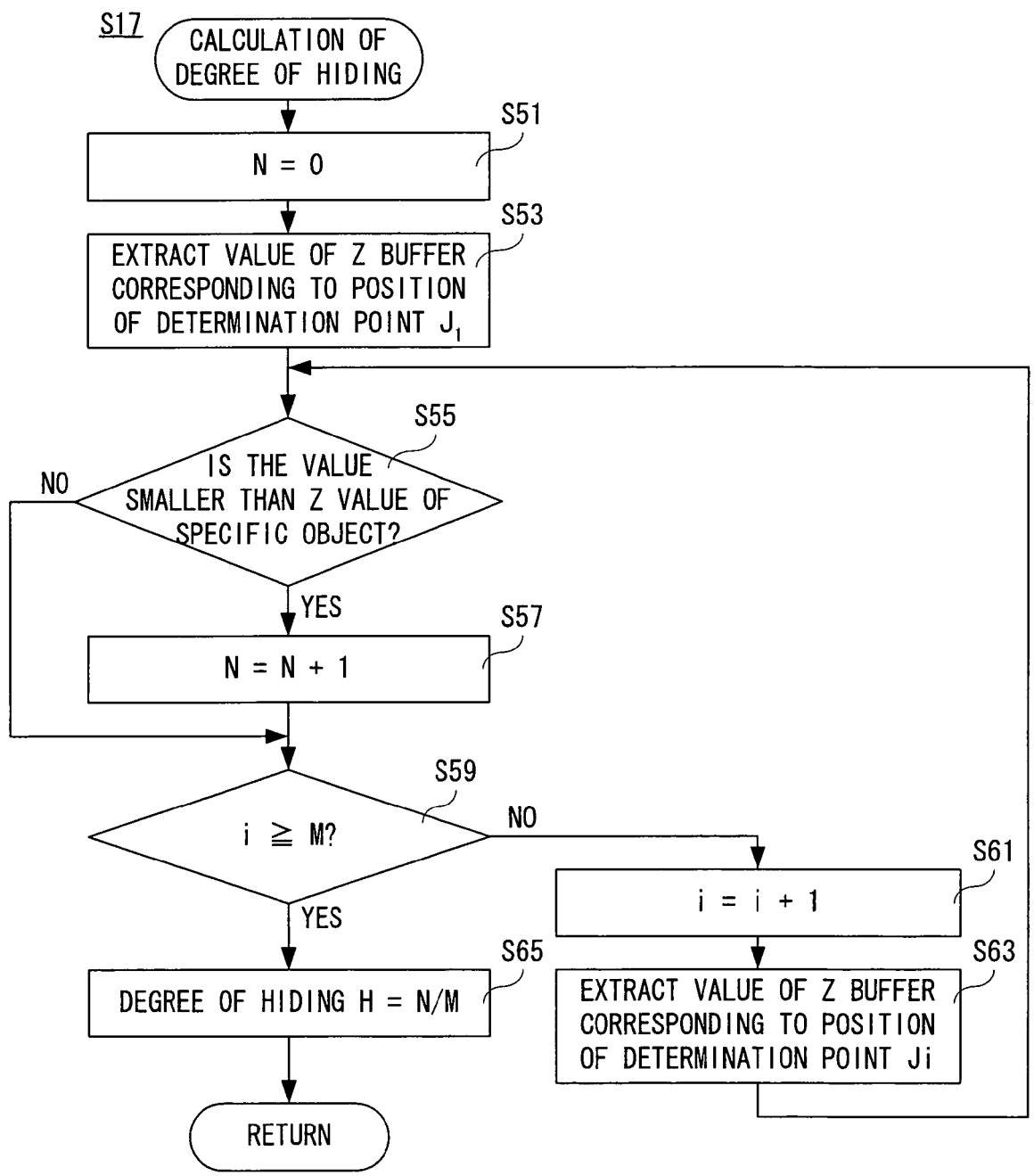
FIG. 12 is a flowchart showing an exemplary degree-of-hiding calculation process of the CPU illustrated in FIG. 2.

In addition, FIG. 12 is a flowchart showing the degree-of-hiding calculation process of the step S17 presented in FIG. 9. Referring to FIG. 12, when it has started the degree-of-hiding calculation process, the CPU 36 initializes the number N (N=0) of determination points Ji whose Z values are smaller than the reference Z value in a step S51. Next, a value of the Z buffer 50 (Z value) corresponding to the positions of the determination points J1 are extracted. More specifically, the Z value of a position corresponding to a first determination point (the position indicated by the determination point data 404h) selected out of the set M determination points in predetermined order or in a random manner is read out from the Z buffer 50.

In a succeeding step S55, it is determined whether or not the Z value of the determination point Ji is smaller than the Z value of the specific object, that is, the reference Z value. If "NO" in the step S55, that is, if the Z value of the determination point Ji exceeds the reference Z value, the process proceeds directly to a step S59. On the other hand, if "YES" in the step S55, that is, if the Z value of the determination point Ji is smaller than the reference Z value, the number N of the determination points Ji whose Z values are smaller than the reference Z value is incremented (N=N+1) and then the process proceeds to the step S59.

In the step S59, it is determined whether $i \geq M$ or not. That is, it is determined whether or not it has been determined that the Z values are smaller than the reference Z value with respect to all the determination points Ji. If i<M here, that is, if it has not been determined that the Z values are smaller than the reference Z value with respect to all the determination points Ji, the result becomes "NO" and the variable i is incremented (i=i+1) in a step S61, and the value of the Z buffer 50 corresponding to the position of the determination point Ji is extracted, that is, the Z value is read out with respect to the next determination point Ji in a step S63, and then the process returns to the step S55. However, if $i \geq M$, that is, if it has been determined that the Z values are smaller than the reference value with respect to all the determination points Ji, the result becomes "YES", the degree of hiding H is calculated according to Equation 1 in a step S65, and the degree-of-hiding calculation process is returned.

According to this illustrative embodiment, determination points are set with respect to a specific projected and converted object, and the degree of hiding of a specific object is calculated on the basis of the Z values of the determination points and the Z value of the specific object. This makes it easy to calculate the degree of hiding. Accordingly, it is possible to control the movement of the viewpoint in accordance with the degree of hiding. It is also possible to change the brightness of the viewpoint in response to the degree of hiding, thereby producing a more real scenic effect. However, the control over movement of the viewpoint and the changing of brightness of the light source are just examples, and it is to be noted that screen generation can be done according to the degree of hiding. For example, the gaze point can be changed in response to the degree of hiding. Also, it is possible to alter the kind, color or attenuation of the light source, or a combination of two or more out of them.

Besides, in this illustrative embodiment, the movement of the viewpoint is controlled depending on whether or not the degree of the hiding exceeds the threshold value. Alternatively, it is possible to move the viewpoint at all times at a movement speed corresponding to the degree of hiding. For instance, the viewpoint is moved at a relatively slow movement speed if the degree of hiding is low, and is moved at a relatively high movement speed if the degree of hiding is high, which makes it possible to swiftly avoid a situation in which it is hard to see a hidden object such as a player object.

Also, in this illustrative embodiment, the brightness of the light source is modified in such a manner as to have an intensity multiplied by a proportion according to the degree of hiding. Alternatively, it is possible to establish one or two or more threshold values in order to change the brightness in steps.

Figure 13:
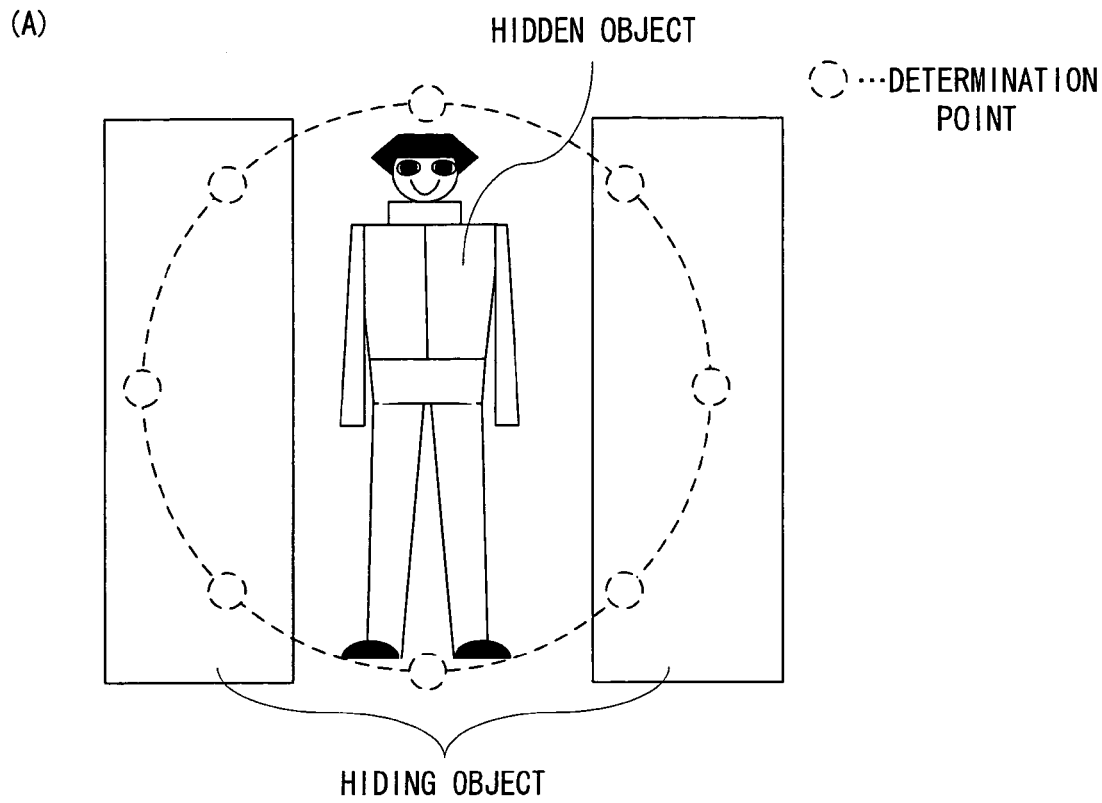
FIG. 13 is an illustrative view showing another example where a hiding material exists between the viewpoint and the hidden object, and another example of the method for setting determination points.
Figure 13:
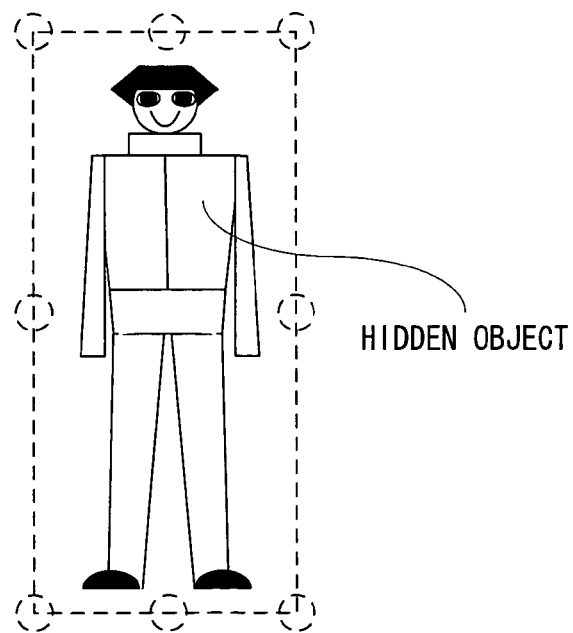

In addition, in this illustrative embodiment, determination points are set on the circumference of a circle adjacent to and embracing the projected and converted hidden object for easy setting. However, determination points can be arbitrarily set anywhere within an area adjacent to and embracing the hidden object. In the case of the above described illustrative embodiment, however, such setting of determination points may be not appropriate for a portrait-oriented object such as a person object. For example, as shown in FIG. 13 (A), if hiding objects exist on both sides of a hidden object and closer to the viewpoint than the hidden object, the degree of hiding becomes high even though the hidden object is not actually hidden. Therefore, for a hidden object in portrait orientation such as person object, it is also possible to set determination points on the circumference of a portrait-oriented rectangle whose center is the position coordinate of the hidden object and which is adjacent to and embraces the hidden object, as shown in FIG. 13 (B). Although not illustrated, as for a hidden object in landscape orientation, it is possible to set determination points on the circumference of a landscape-oriented rectangle. That is, it is possible to determine the degree of hiding more accurately by setting determination points on the circumference of a graphic form more similar in shape to a hidden object.

Moreover, in this illustrative embodiment, eight determination points are set on the circumference of a circle, but the number of determination points is not to be limited to this. Still, it can be said that the degree of hiding can be calculated more accurately as the number of determination points increases.

Furthermore, in this illustrative embodiment, a description is given as to a game system in which the video game apparatus and the monitor are separately provided. It is needless to say that the illustrative embodiments are also applicable to hand-held game apparatus to which a monitor and a game apparatus are integrally provided, mobile phones with game capabilities, and computers such as PDAs and lap-top PCs.

In addition, it goes without saying that the illustrative embodiments can be applied to production of CG movie films, not limited to generation of game images.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three-dimensional image generating apparatus which generates a three-dimensional image according to an operator's operation input, comprising:

operation input detecting programmed logic circuitry which detects the operator's operation input;

object data storage which stores object data for rendering objects forming a three-dimensional image;

virtual three-dimensional space generating programmed logic circuitry which generates a virtual three-dimensional space based on the operation input detected by said operation input detecting programmed logic circuitry and the object data stored in said object data storage;

viewpoint controlling programmed logic circuitry which controls a viewpoint within the virtual three-dimensional space generated by said virtual three-dimensional space generating programmed logic circuitry;

display image generating programmed logic circuitry which generates an image of said virtual three-dimensional space seen from the viewpoint controlled by said viewpoint controlling programmed logic circuitry, which is projected within said three-dimensional space;

depth value storage which stores a depth value of each pixel of the image generated by said display image generating programmed logic circuitry;

object arrangement position storage which stores at least an arrangement position of a specific object in said virtual three-dimensional space;

determination point setting programmed logic circuitry which sets a predetermined number of determination points around a predetermined perimeter containing the arrangement position of said specific object in said image;

determining programmed logic circuitry which determines whether or not a first depth value of the predetermined number of determination points set by said determination point setting programmed logic circuitry is smaller than a second depth value of said specific object; and a degree-of-hiding calculator which calculates a degree of hiding of said specific object according to the number of said determination points where it is determined by said determining programmed logic circuitry that said first depth value is smaller than said second depth value.

2. A three-dimensional image generating apparatus according to claim 1, wherein said determination point setting programmed logic circuitry sets said determination points on the circumference of a circle, said circumference defining the predetermined perimeter, adjacent to and embracing the specific object projected in said three-dimensional space.

3. A three-dimensional image generating apparatus according to claim 1, wherein said degree-of-hiding calculator calculates a proportion of the number of said determination points where it is determined by said determining programmed logic circuitry that said first depth value is smaller than said second depth value, with respect to the total number of said determination points; and said viewpoint controlling programmed logic circuitry moves said viewpoint to another location according to the proportion calculated by said degree-of-hiding calculator.

4. A three-dimensional image generating apparatus according to claim 3, wherein said viewpoint controlling programmed logic circuitry repeats the movement of said viewpoint until the proportion calculated by said degree-of-hiding calculator becomes smaller than a predetermined value.

5. A three-dimensional image generating apparatus according to claim 1, wherein said degree-of-hiding calculator calculates a proportion of the number of said determination points where it is determined by said determining programmed logic circuitry that said first depth value is smaller than said second depth value, with respect to the total number of said determination points, further comprising:

parameter changing programmed logic circuitry which changes a parameter related to display of said specific object according to the proportion calculated by said degree-of-hiding calculator.

6. A three-dimensional image generating apparatus according to claim 5, wherein said specific object includes a light source; and said parameter changing programmed logic circuitry changes at least the brightness of said light source.

7. A storage medium storing a three-dimensional image generating program for a three-dimensional image generating apparatus, comprising:

operation input detecting programmed logic circuitry which detects an operator's operation input;

object data storage which stores object data for rendering objects forming a three-dimensional image;

display image generating programmed logic circuitry which generates an image of a virtual three-dimensional space seen from a viewpoint; and depth value storage which stores a depth value of each pixel of said image generated by said display image generating programmed logic circuitry, wherein said three-dimensional image generating program causes a processor of said three-dimensional image generating apparatus to execute:

a virtual three-dimensional space generating step of generating said virtual three-dimensional space based on the operation input detected by said operation input detecting programmed logic circuitry and the object data stored in said object data storage;

a viewpoint controlling step of controlling a viewpoint within the virtual three-dimensional space generated in said virtual three-dimensional space generating step;

a display image generating step of generating said image of said virtual three-dimensional space seen from the viewpoint controlled in said viewpoint controlling step;

an object arrangement position storing step of storing at least an arrangement position of a specific object in said virtual three-dimensional space;

a determination point setting step of setting a predetermined number of determination points around a predetermined perimeter containing the arrangement position of said specific object of said image;

a determining step of determining whether or not a first depth value of the predetermined number of determination points set in said determination point setting step is smaller than a second depth value of said specific object; and a degree-of-hiding calculating step of calculating a degree of hiding of said specific object according to the number of said determination points where it is determined by said determining step that said first depth value is smaller than said second depth value.

8. A storage medium storing a three-dimensional image generating program according to claim 7, wherein in said determination point setting step, in case where said specific object is projected within said virtual three-dimensional space, said determination points are set on the circumference of a circle, said circumference defining the predetermined perimeter, adjacent to and embracing said specific object projected within said three-dimensional space.

9. A storage medium storing a three-dimensional image generating program according to claim 7, wherein in said degree-of-hiding calculating step, a proportion of the number of said determination points, where it is determined in said determining step that said first depth value is smaller than said second depth value, is calculated with respect to the total number of said determination points; and in said viewpoint controlling step, said viewpoint is moved to another location according to the proportion calculated in said degree-of-hiding calculating step.

10. A storage medium storing a three-dimensional image generating program according to claim 9, wherein in said viewpoint controlling step, the movement of said viewpoint is repeated until the proportion calculated in said degree-of-hiding calculating step becomes smaller than a predetermined value.

11. A storage medium storing a three-dimensional image generating program according to claim 7, wherein in said degree-of-hiding calculating step, a proportion of the number of said determination points where it is determined in said determining step that said first depth value is smaller than said second depth value, is calculated with respect to the total number of said determination points, and further causing the processor to execute:

a parameter changing step of changing a parameter related to display of said specific object according to the proportion calculated in said degree-of-hiding calculating step.

12. A storage medium storing a three-dimensional image generating program according to claim 11, wherein said specific object includes a light source; and in said parameter changing step, at least the brightness of said light source is changed.

13. A three-dimensional image generating method for a three-dimensional image generating apparatus comprising operation input detecting programmed logic circuitry which detects an operator's operation input; object data storage which stores object data for rendering objects forming a three-dimensional image; and depth value storage which stores a depth value of each pixel of said image, including the steps of:

(a) generating a virtual three-dimensional space based on the operation input detected by the operation input detecting programmed logic circuitry and the object data stored in the object data storage;

(b) controlling a viewpoint within the virtual three-dimensional space generated in said step (a);

(c) generating an image of said virtual three-dimensional space seen from the viewpoint controlled in said step (b);

(d) storing at least an arrangement position of a specific object in said virtual three-dimensional space;

(e) setting a predetermined number of determination points around a predetermined perimeter containing the arrangement position of said specific object in said image;

(f) determining whether or not a first depth value of the predetermined number of determination points set in said step (e) is smaller than a second depth value of said specific object; and (g) calculating the degree of hiding of said specific object according to the number of said determination points where it is determined in said step (f) that said first depth value is smaller than said second depth value.

14. A three-dimensional image generating method according to claim 13, wherein in step (e), if said specific object is projected within said virtual three-dimensional space, said determination points are set on the circumference of a circle, said circumference defining the predetermined perimeter, adjacent to and embracing the specific object projected within said virtual three-dimensional space.

15. A three-dimensional image generating method according to claim 13, wherein a proportion of the number of said determination points, for which it is determined in said step (f) that said first depth value is smaller than said second depth value is calculated in step (g), with respect to the total number of said determination points; and said viewpoint in step (b) is moved to another location according to the proportion calculated in step (g).

16. A three-dimensional image generating method according to claim 15, wherein the movement of said viewpoint in said step (b) is repeated until the proportion calculated in said step (g) becomes smaller than a predetermined value.

17. A three-dimensional image generating method according to claim 13, wherein a proportion of the number of said determination points, for which it is determined in said step (f) that said first depth value is smaller than said second depth value, is calculated in said step (g), with respect to the total number of said determination points, and further causes the processor to execute:

a step (h) of changing a parameter related to display of said specific object according to the proportion calculated in said step (g).

18. A three-dimensional image generating method according to claim 17, wherein said specific object includes a light source; and at least the brightness of said light source is changed in said step (h).

19. A method of adjusting a game display comprising the steps of:

generating a display of a game object in a virtual environment including at least one additional virtual object different from the game object;

defining a plurality of determination points associated with the game object, arranged along the perimeter of a shape approximately centered on the game object and having sufficient area so as to substantially contain the game object therein;

associating a depth value with the game object;

associating a depth value with each visible pixel;

associating a depth value, based on the depth value associated with the visible pixel which is present at the position of the determination point, with each of the determination points, determining whether a user view of each determination point is blocked by at least one interposing additional virtual object by comparing the depth value associated with each determination point to the depth value associated with the game object; and adjusting the display responsive at least in part to the number of determination points that are blocked.

20. The method of claim 19 wherein the adjusting step includes adjusting a virtual camera angle such that a user view of at least a predefined number of determination points is no longer obstructed by at least one interposing virtual object.

21. The method of claim 19 wherein the game object has a brightness characteristic associated therewith, and the adjusting steps further includes adjusting the brightness characteristic responsive at least in part to the number of determination points that are blocked.

22. The method of claim 19 wherein the shape is a circle.

\* \* \* \* \*